(12) United States Patent  (10) Patent No.: US 9,007,464 B2
Matsuzawa et al.  (45) Date of Patent: Apr. 14, 2015

(54) PHOTOGRAPHING APPARATUS, PHOTOGRAPHING SYSTEM, PHOTOGRAPHING METHOD, AND PROGRAM STORED IN NON-TRANSITORY MEDIUM IN PHOTOGRAPHING APPARATUS

(71) Applicant: Olympus Imaging Corp., Shibuya-ku, Tokyo (JP)

(72) Inventors: Yoshinori Matsuzawa, Hachioji (JP); Osamu Nonaka, Sagamihara (JP); Yoshiyuki Nada, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 14/275,375

(22) Filed: May 12, 2014

(65) Prior Publication Data

US 2014/0247371 A1  Sep. 4, 2014

Related U.S. Application Data

(63) Continuation of application No. 13/042,099, filed on Mar. 7, 2011, now Pat. No. 8,760,518.

(30) Foreign Application Priority Data

Mar. 8, 2010 (JP) .................................. 2010-050888

(51) Int. Cl.
*H04N 7/18* (2006.01)
*H04N 5/232* (2006.01)
*H04N 5/247* (2006.01)
*H04N 5/235* (2006.01)

(52) U.S. Cl.
CPC ....... *H04N 5/23203* (2013.01); *H04N 5/23219* (2013.01); *H04N 5/2354* (2013.01); *H04N 5/247* (2013.01)

(58) Field of Classification Search
USPC ............... 348/157, 159, 211.99–211.4, 218.1
See application file for complete search history.

(56) References Cited

U.S. PATENT DOCUMENTS 7,511,737 B2 *  3/2009  Singh .......................... 348/211.3
2008/0266419 A1 * 10/2008  Drimbarean et al. ...... 348/229.1

* cited by examiner

*Primary Examiner* — Timothy J Henn
(74) *Attorney, Agent, or Firm* — Straub & Pokotylo; John C. Pokotylo

(57) ABSTRACT

A photographing apparatus of the invention which is capable of photographing a desired object by making a plurality of photographing apparatuses cooperative with one another includes: an image pickup section; a detection section for acquiring photographing information related to an image acquired by the image pickup section; a transmission section for transmitting the photographing information acquired by the detection section; a reception section for receiving an image photographed and transmitted by another photographing apparatus based on the photographing information; and a memory control section for storing the image acquired by the image pickup section and the image received by the reception section in association with each other.

7 Claims, 11 Drawing Sheets

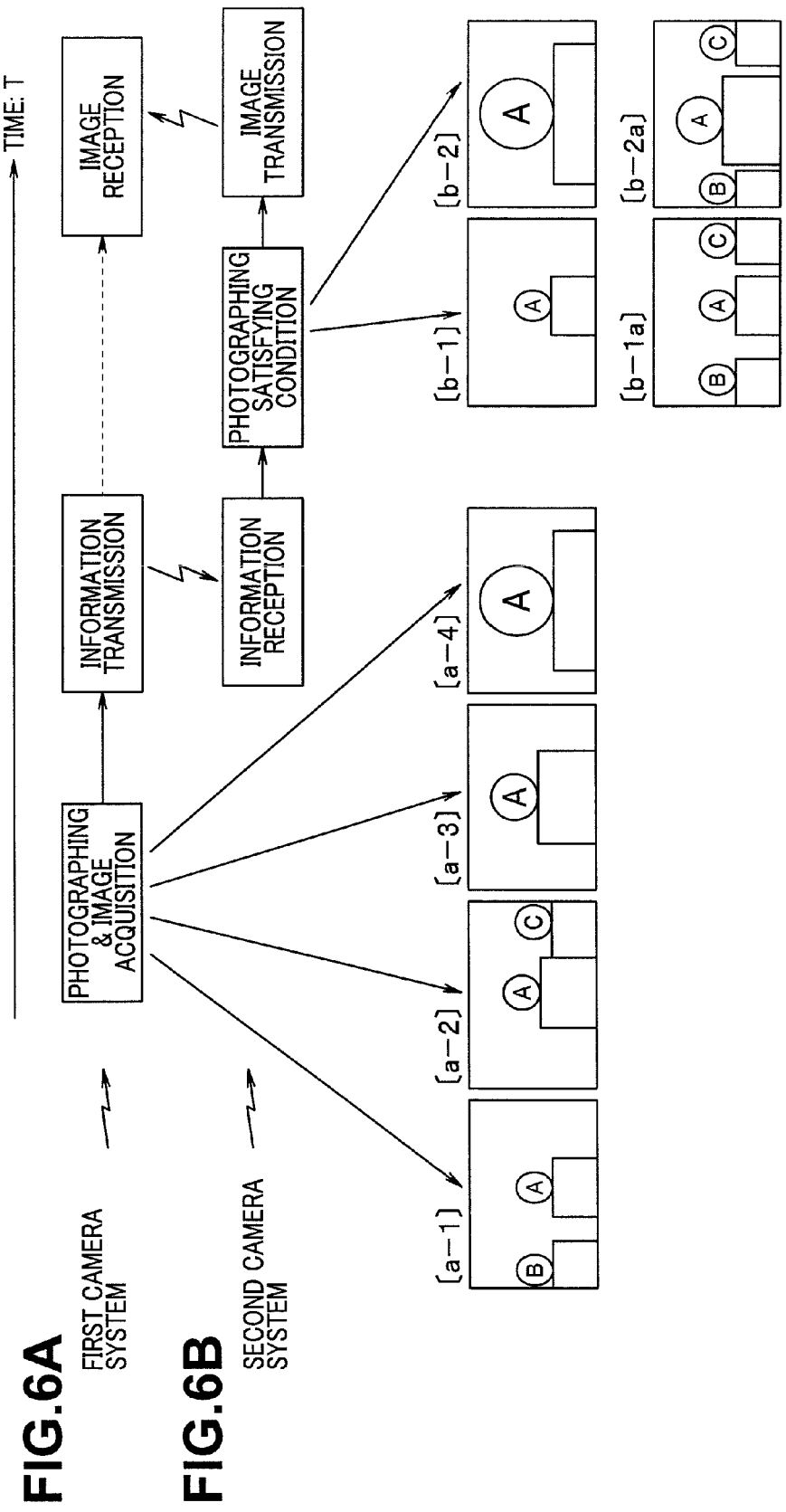

FIG.10A FIRST CAMERA SYSTEM
FIG.10B SECOND CAMERA SYSTEM

FIG.12
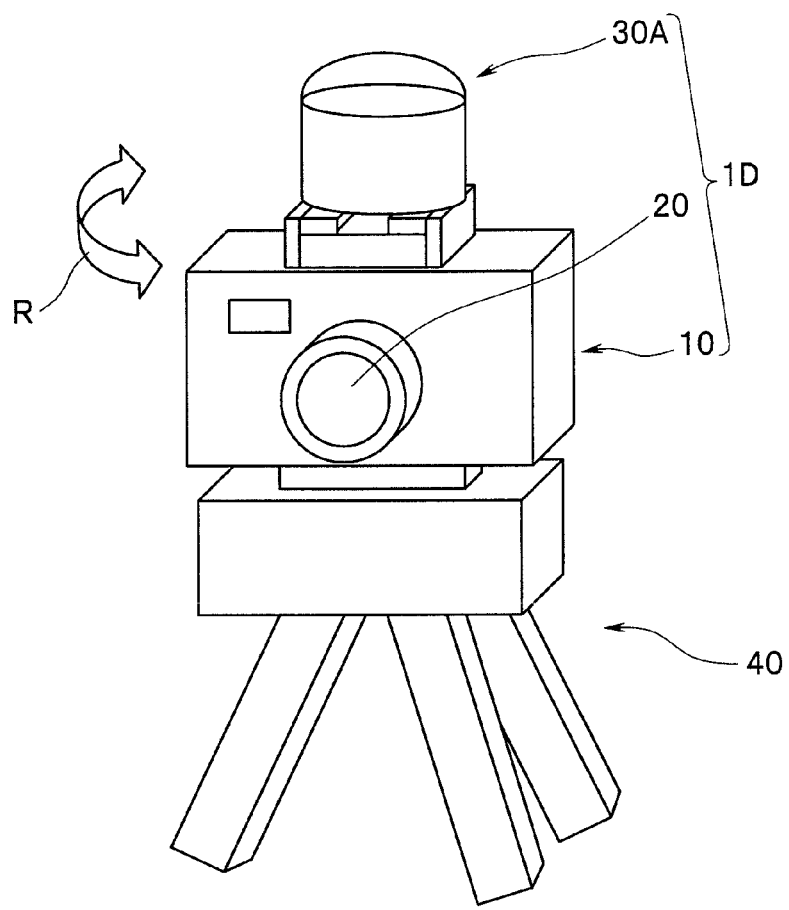
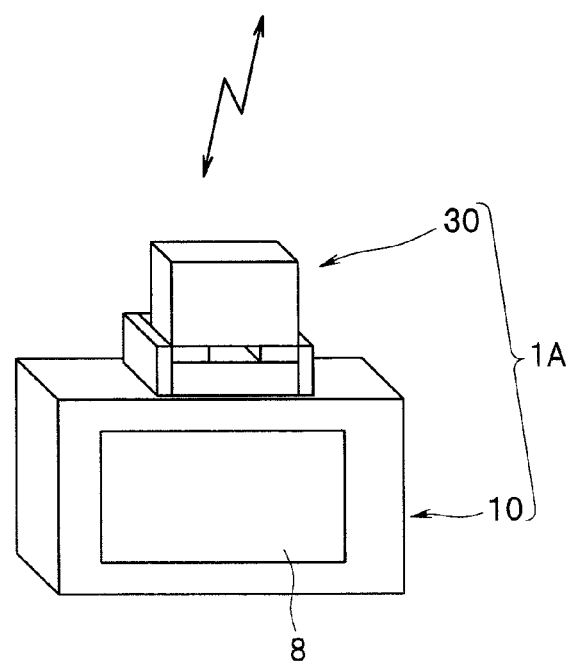

PHOTOGRAPHING APPARATUS, PHOTOGRAPHING SYSTEM, PHOTOGRAPHING METHOD, AND PROGRAM STORED IN NON-TRANSITORY MEDIUM IN PHOTOGRAPHING APPARATUS

CROSS-REFERENCE TO RELATED APPLICATIONS

This application is a continuation of U.S. patent application Ser. No. 13/042,099 (referred to as "the '099 application" and incorporated herein by reference), titled "PHOTOGRAPHING APPARATUS, PHOTOGRAPHING SYSTEM AND PHOTOGRAPHING METHOD," filed on Mar. 7, 2011, and listing Yoshinori MATSUZAWA, Osamu NONAKA and Yoshiyuki NADA as inventors, the '099 application being based upon and claiming the benefit of priority from Japanese Patent Application No. 2010-050888, filed on Mar. 8, 2010, the entire contents of which are incorporated herein by reference.

BACKGROUND OF THE INVENTION

1. Field of the Invention

The present invention relates to a photographing apparatus and a photographing system, and more particularly to a photographing apparatus capable of photographing a desired object cooperatively with a plurality of photographing apparatuses, a photographing system using the photographing apparatus and a photographing method in the photographing system.

2. Description of the Related Art

In recent years, photographing apparatuses such as digital cameras, video cameras and the like have been generally put into practical use and widely spread. Such photographing apparatuses are capable of sequentially converting an optical image formed by a photographing optical system into an image signal using a photoelectric conversion device such as a solid-state image pickup device, and capable of storing the image signal acquired by the conversion as image data in a predetermined form in a memory medium, and configured by including an image display device such as a liquid crystal display (LCD) device on which the image data stored in the memory medium is reproduced and displayed as an image.

Such a type of photographing apparatuses have a feature in that various image processings are easily performed by performing various signal processings on the acquired image data. Therefore, by taking advantage of such a feature, the above-described type of photographing apparatuses are capable of easily acquiring intended images depending on various photographing scenes which have been difficult to be photographed by conventional photographing methods.

For example, it is possible to perform what is called a multi-screen photographing in which a plurality of images are combined based on a plurality of image data acquired by photographing using such photographing apparatuses to generate a single image, or it is possible to generate image data in various forms by using a plurality of image data acquired by a plurality of photographing apparatuses.

On the other hand, conventional photographing apparatuses are usually used such that one photographer performs photographing by using a single photographing apparatus in an ordinary case. The image data acquired in this case represents a predetermined range including a desired object located at a position toward which the photographing apparatus faces, as one still image or one moving image.

However, when a moving image data acquired by a moving image photographing is reproduced and displayed, in particular, if the moving image is taken from one viewpoint, the video is likely to be monotonous because there is no switching of screens.

Therefore, conventionally, a plurality of people have performed photographing by respectively using a plurality of photographing apparatuses to acquire a plurality of moving image data, and thereafter have transferred the plurality of moving image data to an image editing apparatus, for example, and moving image data including switching of screens have been generated by performing data editing work using the image editing apparatus.

However, in such a conventional method, the photographing operation itself has been an extensive work, and in addition, a cumbersome data editing work has been required. Therefore, it has been difficult for an average photographer to perform such a photographing.

In order to address such a problem, various techniques have been conventionally proposed. For example, Japanese Patent Application Laid-Open Publication No. 2007-173963 discloses a technique of enabling a plurality of photographing apparatuses to cooperate with one another by using a communication function, to thereby easily generate moving image data for allowing a wide variety of reproduction and display by easy and smooth switching among a plurality of viewpoints, regardless of a photographing skill of a photographer.

In addition, the photographing apparatus disclosed in the Japanese Patent Application Laid-Open Publication No. 2007-173963 generates one moving image data by what is called a multi-angle photographing in which a series of actions having one temporal flow (a footrace in an athletic meet, for example) is photographed by a plurality of photographing apparatuses in a shared manner by making the plurality of photographing apparatuses cooperative with one another, and a plurality of moving image data acquired by the respective photographing apparatuses are transferred to one photographing apparatus, and thereafter the plurality of moving image data are joined together and edited according to the temporal flow and a series of actions as a photographing target is stored from a plurality of viewpoints.

SUMMARY OF THE INVENTION

A photographing apparatus according to one aspect of the present invention includes: an image pickup section; a detection section for acquiring photographing information related to an image acquired by the image pickup section; a transmission section for transmitting the photographing information acquired by the detection section; a reception section for receiving an image photographed and transmitted by another photographing apparatus based on the photographing information; and a memory control section for storing the image acquired by the image pickup section and the image received by the reception section in association with each other.

A photographing apparatus according to another aspect of the present invention includes: an image pickup section; a reception section for receiving an image transmitted from another photographing apparatus and photographing information related to the image; and a control section for performing photographing control based on the photographing information received by the reception section and an image acquired by the image pickup section.

A photographing system according to one aspect of the present invention is capable of performing photographing by making a plurality of photographing apparatuses including at least a first photographing apparatus and a second photographing apparatus cooperative with each other, and the photographing system includes: the first photographing apparatus including a first image pickup section, a transmission section for transmitting photographing information acquired based on an image acquired by the first image pickup section to the second photographing apparatus, and a first reception section for receiving an image transmitted from the second photographing apparatus; and the second photographing apparatus including a second reception section for receiving the photographing information transmitted from the first photographing apparatus, a second image pickup section for acquiring an image based on the photographing information received by the second reception section, and a transmission section for transmitting the image acquired by the second image pickup section to the first photographing apparatus, wherein the first photographing apparatus stores the image acquired by the first image pickup section and the image received by the first reception section in association with each other.

A photographing method according to one aspect of the present invention includes: a detection step of acquiring photographing information related to an image acquired by an image pickup section; a transmission step of transmitting the photographing information acquired in the detection step; a reception step of receiving an image photographed by another photographing apparatus based on the photographing information and transmitted from the other photographing apparatus; and a memory step of storing the image acquired in the detection step and the image received in the reception step in association with each other.

Advantages of the present invention will be more apparent from the following detailed description.

BRIEF DESCRIPTION OF THE DRAWINGS

FIGS. 5A to 5C are views showing display examples of images based on image data acquired when photographing is performed under the situation shown in FIG. 4, in which FIGS. 5A and 5B are views showing examples of images acquired by a first photographing apparatus, and FIG. 5C is a view showing an example of an image acquired by a second photographing apparatus.

FIGS. 6A and 6B are diagrams which show time charts showing, in an order of time series, operations of the respective photographing apparatuses when photographing operation is performed under the situation shown in FIG. 4, and display examples of images based on image data acquired by the respective photographing apparatuses at the time of the respective operations in the time charts, in which FIG. 6A is a time chart showing the operation of the first photographing apparatus along the time axis, and FIG. 6B is a time chart showing the operation of the second photographing apparatus along the time axis.

FIGS. 8A and 8B are diagrams which show time charts showing, in an order of time series, operations of photographing apparatuses when photographing is performed using a plurality of photographing apparatuses according to a second embodiment of the present invention, and display examples of images based on image data acquired by the respective photographing apparatuses at the time of the respective operations in the time charts, in which FIG. 8A is a time chart showing the operation of the first photographing apparatus along the time axis, and FIG. 8B is a time chart showing the operation of the second photographing apparatus along the time axis.

FIGS. 10A and 10B are diagrams which show time charts showing, in an order of time series, operations of respective photographing apparatuses when photographing is performed using a plurality of photographing apparatuses according to a third embodiment of the present invention, and display examples of images based on image data acquired by the respective photographing apparatuses at the time of the respective operations in the time charts, in which FIG. 10A is a time chart showing the operation of the first photographing apparatus along the time axis, and FIG. 10B is a time chart showing the operation of the second photographing apparatus along the time axis.

FIG. 12 is a schematic view of a photographing apparatus according to a fourth embodiment of the present invention.

DETAILED DESCRIPTION OF THE PREFERRED EMBODIMENTS

Figure 1:
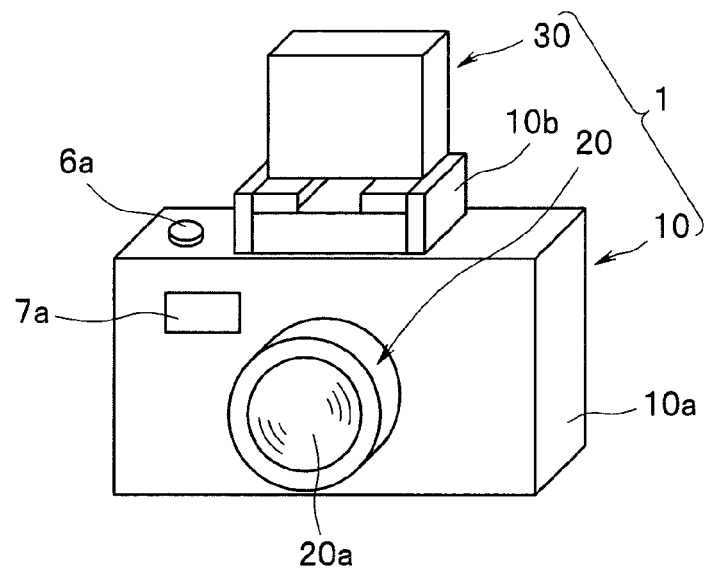
FIG. 1 is a schematic perspective view showing an appearance of a front face side of a photographing apparatus according to a first embodiment of the present invention.

Description will be made on photographing apparatuses according to the embodiments of the present invention by taking a camera system using a digital camera which can handle optical images as image data and can perform wireless communication with other apparatuses, as an example.

Note that, in the drawings used for describing the embodiments below, a different scale size is used for each of the components in order to allow each of the components to be illustrated in a recognizable size in the drawings, and the present invention is not limited to the number, shapes, ratio of the sizes of the components, and a relative positional relationship among the components shown in these drawings.

First Embodiment

Figure 2:
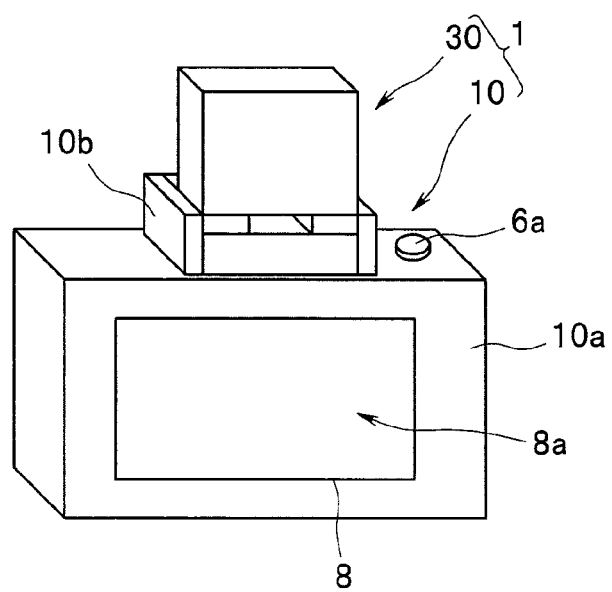
FIG. 2 is a schematic perspective view showing an appearance of a rear face side of the photographing apparatus according to the first embodiment of the present invention.
Figure 3:
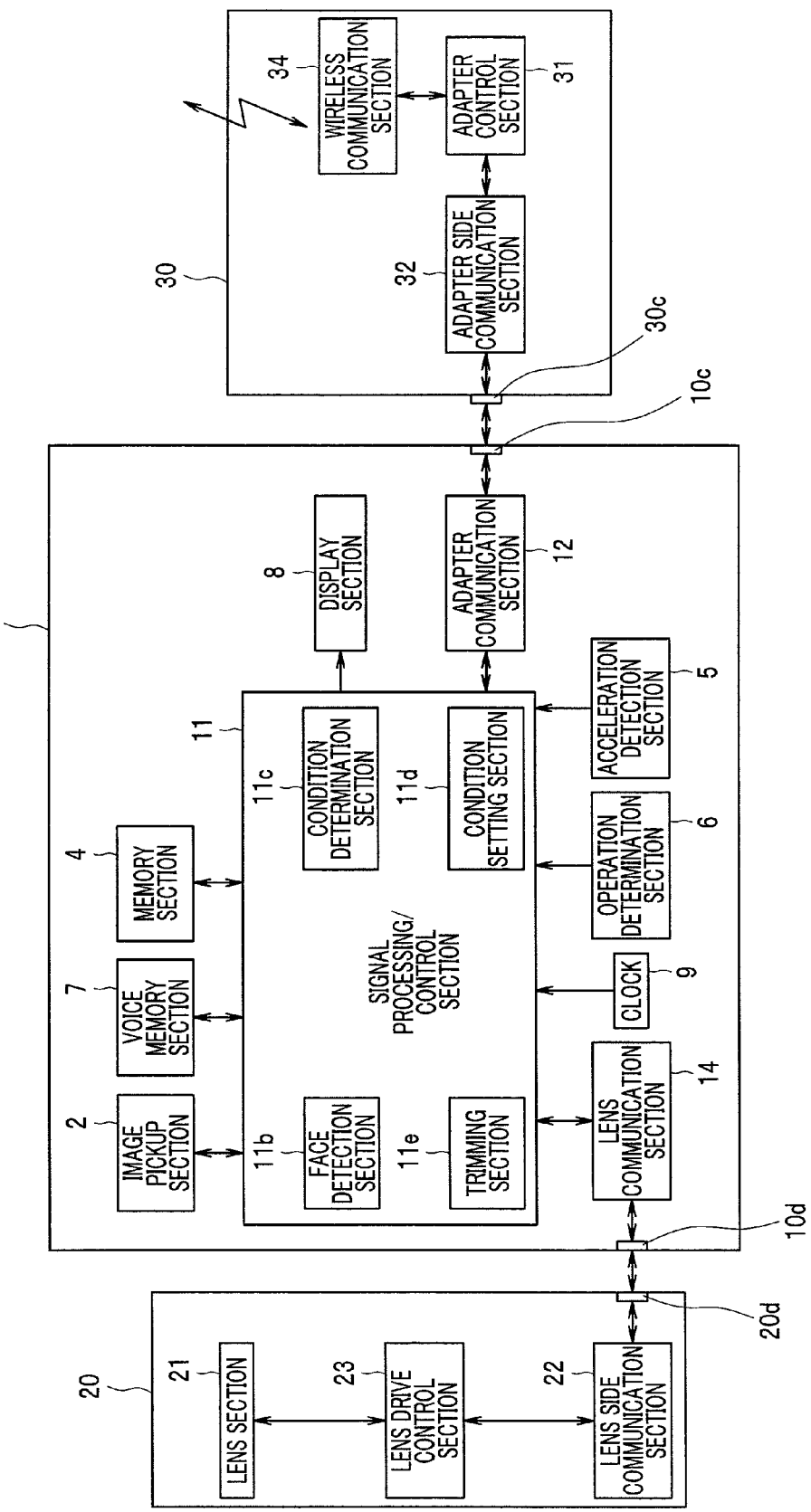
FIG. 3 is a block configuration diagram showing a main configuration of the photographing apparatus according to the first embodiment of the present invention.
Figure 4:
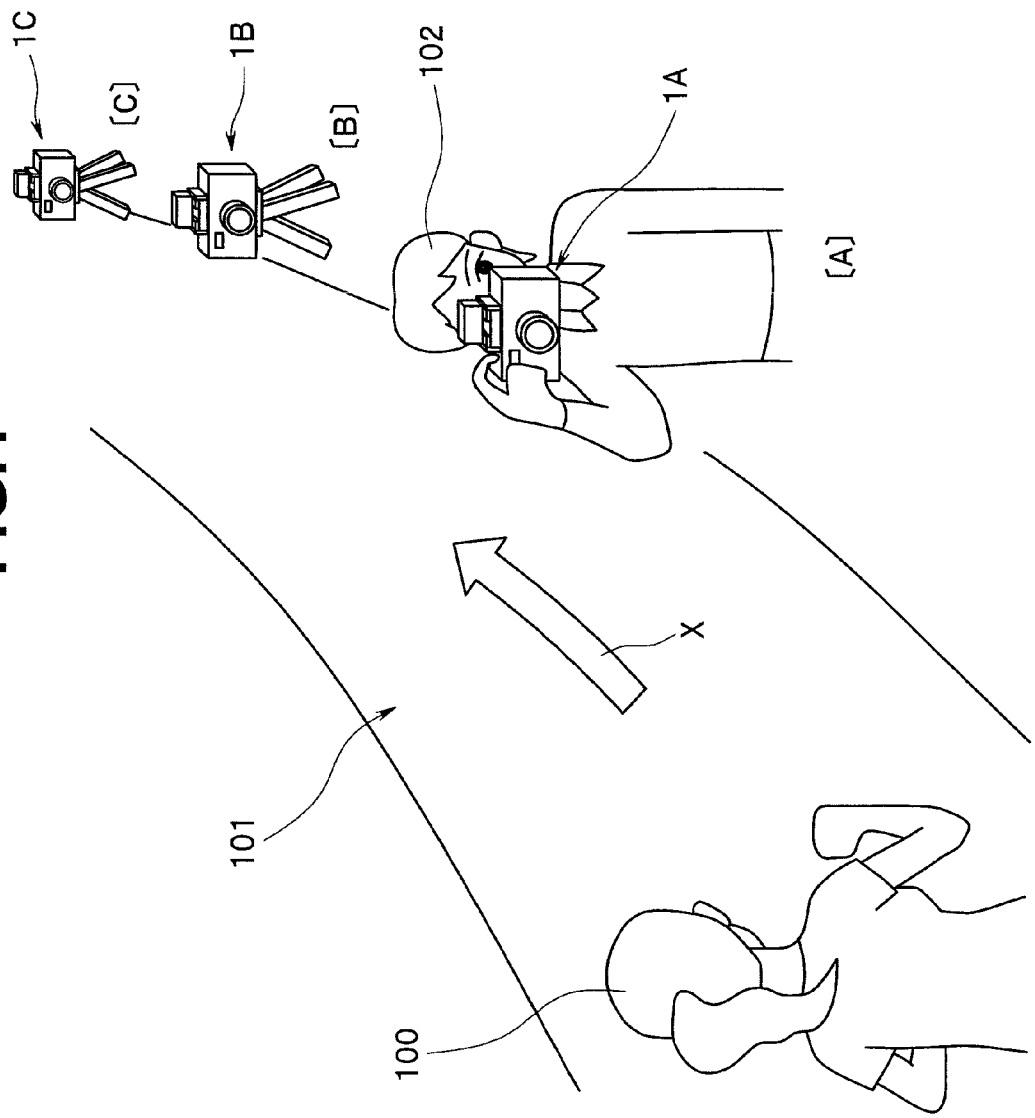
FIG. 4 is a concept view showing a situation in which a desired object is photographed using a plurality of photographing apparatuses according to the first embodiment of the present invention.
Figure 5A:
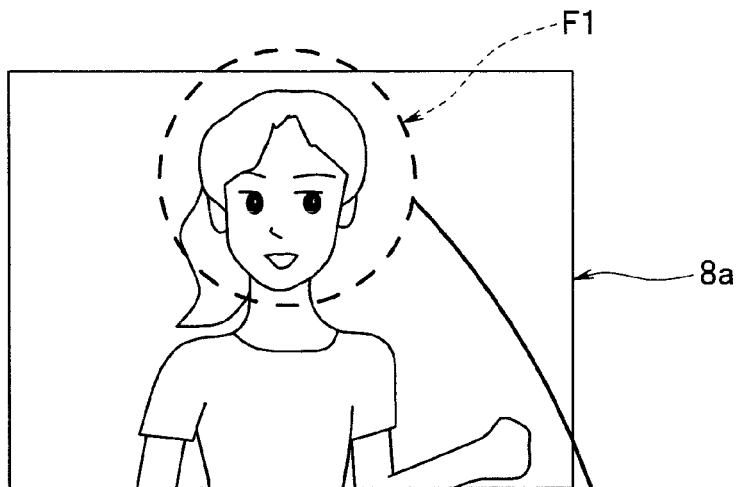
Figure 5B:
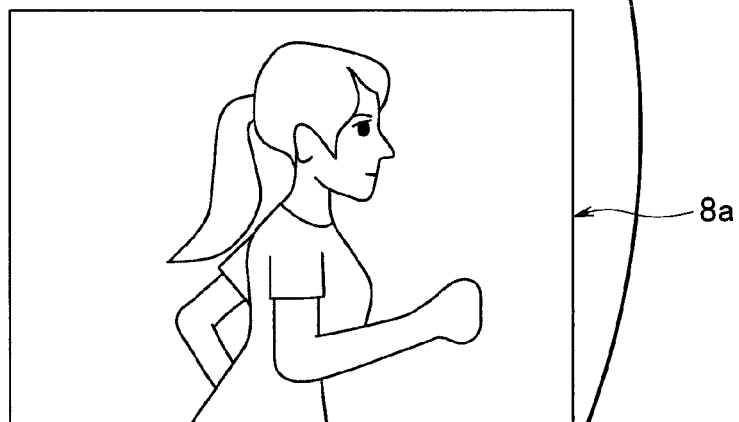
Figure 5C:
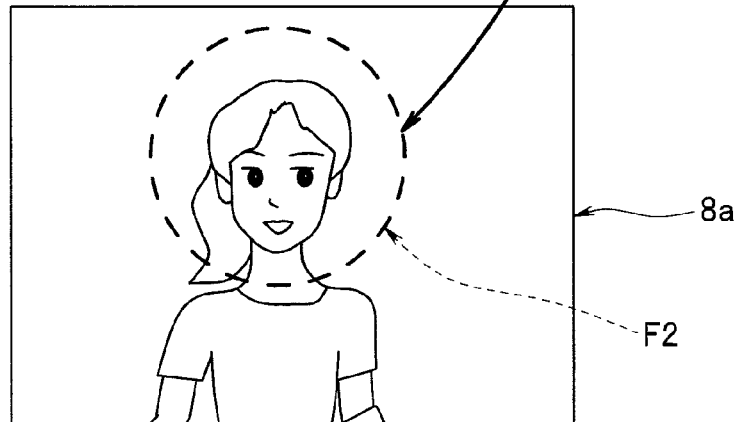

FIG. 1 is a schematic perspective view showing an appearance of a front face side of a photographing apparatus according to a first embodiment of the present invention. FIG. 2 is a schematic perspective view showing an appearance of a rear face side of the photographing apparatus in FIG. 1. FIG. 3 is a block configuration diagram showing a main configuration of the photographing apparatus according to the first embodiment of the present invention. FIG. 4 is a concept view showing a situation in which a desired object is photographed using a plurality of photographing apparatuses according to the first embodiment of the present invention FIG. 5A to 5C are views showing display examples of images based on image data acquired when photographing is performed under the situation shown in FIG. 4, in which FIGS. 5A and 5B are views showing examples of images acquired by a first photographing apparatus, and FIG. 5C is a view showing an example of an image acquired by a second photographing apparatus.

Figure 7:
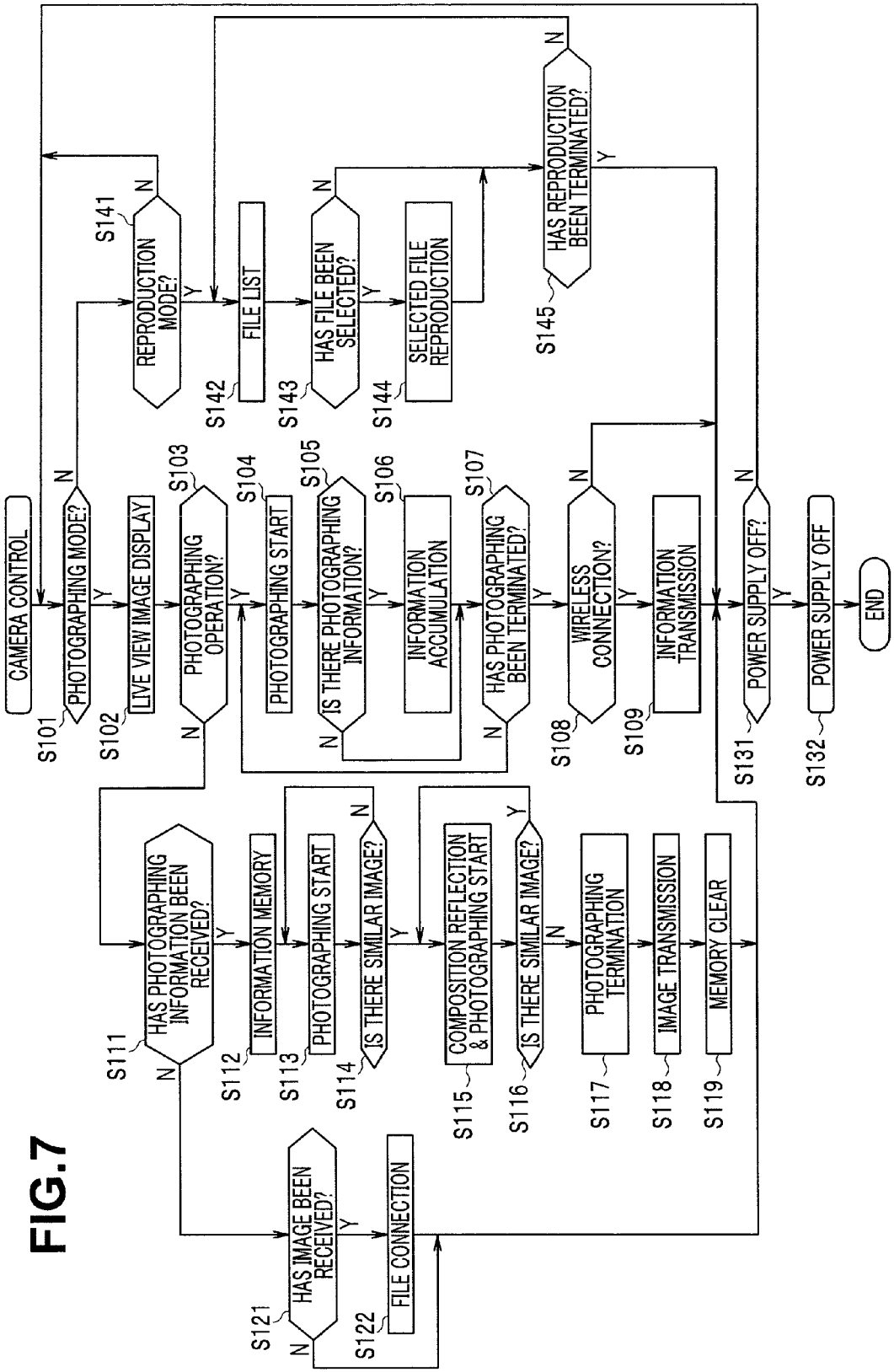
FIG. 7 is a flowchart showing a working of the photographing apparatus according to the first embodiment of the present invention.

FIGS. 6A and 6B are diagrams which show time charts showing, in an order of time series, operations of the respective photographing apparatuses when photographing operation is performed under the situation shown in FIG. 4, and display examples of images based on image data acquired by the respective photographing apparatuses at the time of the respective operations in the time charts, in which FIG. 6A is a time chart showing the operation of the first photographing apparatus along the time axis, and FIG. 6B is a time chart showing the operation of the second photographing apparatus along the time axis. FIG. 7 is a flowchart showing a working of the photographing apparatus according to the present embodiment.

First, a main configuration of the photographing apparatus according to the first embodiment of the present invention will be described below with reference to FIGS. 1 to 3.

A camera system 1 as a photographing apparatus according to the present embodiment includes a camera unit 10, a photographing lens unit 20, a wireless communication adapter 30 and the like.

The camera unit 10 photoelectrically converts an optical image formed by an optical lens (photographing lens unit 20), for example, by using a solid-state image pickup device, etc., and thereafter generates a digital image data by converting an image signal acquired by the photoelectric conversion into digital image data representing a still image or moving image. The digital image data thus generated is stored in a memory medium. In addition, the camera unit 10 is capable of reproducing and displaying a still image or a moving image based on the digital image data stored in the memory medium using a display section. The camera unit 10 includes a wireless communication function for allowing wireless communication with other camera systems 1B, 1C (described later; see FIG. 4) which are external apparatuses and have substantially the same configuration as that of the camera system 1 according to the present embodiment by mounting the wireless communication adapter 30 as an extension unit. Data transmitted and received by the wireless communication include various photographing information data related to photographing, and image data, for example. That is, the wireless communication adapter 30 functions as a reception section and transmission section.

The camera unit 10 includes: various configuration units for enabling a photographing function and a communication function; a camera main body 10a for housing inside thereof these configuration units; and the like.

In detail, the photographing lens unit 20, a microphone 7a which constitutes a part of a voice memory section 7 (described later), and the like are disposed on a front face (face opposing to an object in an ordinary use) of the camera main body 10a (see FIG. 1).

In addition, a plurality of operation members are disposed on a top face and a rear face of the camera main body 10a. In the examples shown in FIGS. 1 and 2, a shutter-release button 6a is illustrated as a typical operation member. The shutter-release button 6a is disposed on the top face of the camera main body 10a. Since other operation members are not directly related to the present invention, illustrations thereof are omitted in order to avoid the complication of the drawings, and it is supposed that the same operation members as those provided in a digital camera of a conventional common configuration are provided.

An accessory shoe 10b of a configuration applied to a conventional common digital camera is formed on the top face of the camera main body 10a. By using the accessory shoe 10b, the wireless communication adapter 30 is detachably disposed. The accessory shoe 10b is provided with a camera side electric contact 10c (see FIG. 3). On the other hand, the wireless communication adapter 30 is provided with an adapter side electric contact 30c corresponding to the electric contact 10c (see FIG. 3). Therefore, when the wireless communication adapter 30 is mounted to the camera main body 10a through the accessory shoe 10b, the camera main body 10a and the wireless communication adapter 30 are electrically connected to each other.

Furthermore, on the rear face (face opposed to the photographer in an ordinary use) of the camera main body 10a, the display section 8 is disposed with the display screen 8a exposed on the outer face.

As shown in FIG. 3, the camera main body 10a contains inside thereof an image pickup section 2, a memory section 4, an acceleration detection section 5, an operation determination section 6, the voice memory section 7, the display section 8, a clock 9, a signal processing/control section 11, an adapter communication section 12, a lens communication section 14 and the like.

The signal processing/control section 11 is a control circuit which collectively controls a whole of the camera system 1 of the present embodiment including the camera unit 10 and which receives various signals outputted from each configuration block in the camera unit 10 to perform various signal processings and control processings.

The signal processing/control section 11 has a circuit section that performs signal processings and control processings performed by a digital camera of conventional common configuration, such as signal processings including an image signal compression/expansion processing, an image signal processing, and a driving control processing of the photographing lens unit 20, the image pickup section 2, the memory section 4, the display section 8 and the like. In addition, the signal processing/control section 11 in the camera system 1 according to the present embodiment includes inside thereof a face detection section 11b, a condition determination section 11c, a condition setting section 11d, a trimming section 11e and the like. Furthermore, though not shown in FIG. 3, the signal processing/control section 11 includes inside thereof a position determination section that determines a position by receiving electric waves from GPS satellites, an orientation determination section composed of a geomagnetic sensor, and the like.

The face detection section 11b is a circuit section that performs a signal processing for carrying out what is called a face detection function for detecting an image region of a particular region (face, for example) of a figure, an animal and the like from the image based on the image signal acquired by the image pickup section 2. The technique of carrying out the face detection function by the face detection section 11b has been widely spread in conventional digital cameras and the like. Therefore, it is supposed that the same technique as the conventional one is applied to the camera unit 10 according to the present embodiment, and the description thereof will be omitted.

The condition determination section 11c is a circuit section that determines photographing conditions when photographing is carried out based on various information acquired from the image data acquired by photographing.

The condition setting section 11d is a circuit section that sets various photographing conditions based on the various information acquired from the image data acquired by photographing.

The trimming section 11e is a circuit section that performs a trimming processing for clipping a predetermined image region from the image signal acquired by the image pickup section 2, based on various photographing information (to be described later) such as the detection result from the face detection section 11b and composition information.

The image pickup section 2 includes: a photoelectric conversion device such as a solid-state image pickup device that receives an optical image formed by the photographing lens unit 20 to convert the optical image into an electric signal corresponding to the optical image; a signal processing circuit that performs a preprocessing of the image signal generated by the photoelectric conversion device; and the like. The image signal generated by the image pickup section 2 is outputted to the signal processing/control section 11. Note that, as the photoelectric conversion device, a solid-state image pickup device such as a CCD (Charge Coupled Device) or a CMOS (Complementary Metal Oxide Semiconductor) is applied.

The memory section 4 includes: a memory medium that receives image data for storing which is acquired by the image pickup section 2 and generated as a result of being subjected to various signal processings, and finally subjected to the signal compression processing in the signal processing/control section 11 and stores and accumulates the image data; a driving circuit that drives the memory medium to perform a memory processing of the image data into the memory medium, a reading processing of the stored image data; and the like.

The acceleration detection section 5 is an attitude detection section that detects a change in the attitude and moving state of the camera unit 10. The acceleration detection section 5 includes, for example, a detection sensor composed of an acceleration sensor that detects acceleration, and a circuit that receives an output signal from the detection sensor to generate a predetermined instruction signal. Note that, instead of the above-described acceleration sensor, an angular velocity sensor (gyroscope) that detects angular velocity can be applied as the attitude detection section.

That is, the acceleration detection section 5 is a constituting section that detects the attitude and moving state of the camera unit 10 including a held state of the camera unit 10 by a user, in other words, a camera shake state, and an inclination state of the camera unit 10, by detecting a gravitational acceleration, oscillation and the like applied to the camera unit 10 in which the acceleration detection section 5 is arranged. In a digital camera of a conventional common configuration, the camera-shake correction function is achieved by driving and controlling a camera-shake correction mechanism, based on the detection result by the acceleration detection section.

The operation determination section 6 is a processing circuit section that receives instruction signals generated by the operation of a plurality of operation members including the shutter-release button 6a by a photographer and determines the operation state.

The voice memory section 7 is configured of the microphone 7a (see FIG. 1) as a voice inputting apparatus that converts voice and the like into electric signals, and a circuit that drives and controls the microphone 7a to perform a compression processing on the voice signal acquired by the microphone 7a to convert the voice signal into voice data in a form suitable for storing, and an expansion processing on the voice signal to convert the voice signal into voice data in a form suitable for reproducing. The voice data generated by the microphone 7a is stored in the memory medium in the memory section 4. Note that, instead of the configuration in which the compression and expansion processings of the voice signal are performed in the voice memory section 7, the signal processings (compression and expansion processings) and the like may be performed in an internal circuit of the signal processing/control section 11.

In addition, in an ordinary case, when the photographing operation of a moving image or a still image is performed, a voice memory operation is simultaneously performed to store the voice data generated based on the acquired voice signal in synchronization with the image, and the voice data is stored also in a voice memory operation mode in which only voice is separately stored.

The display section 8 is a display device that performs an image display operation, display of a setting menu and the like based on the image signal for display generated as a result of the signal processings by the signal processing/control section 11. As the display section 8, a liquid crystal display (LCD) device, an organic EL display or the like is used.

When the camera unit 10 is used in a photographing operation mode, for example, the images based on the image signals acquired by the image pickup section 2 are continuously displayed on the display section 8. The photographer determines a composition and a timing of shutter release while viewing the real-time images. That is, the display section 8 mainly functions as a viewfinder apparatus at the time of photographing operation. In addition, when the setting menu is displayed on the display section 8, the photographer can perform various setting selection operations with respect to the camera unit 10 by using various operation members. Furthermore, when the camera unit 10 is used in a reproduction operation mode, the images based on the image data already stored in the memory medium are displayed on the display section 8. That is, the display section 8 mainly functions as an image reproducing apparatus at the time of reproduction operation.

In addition, though not specifically shown in the drawings, the display section 8 according to the present embodiment includes a voice outputting apparatus such as a speaker for uttering and displaying a corresponding voice based on the voice signal stored by the microphone 7a of the voice memory section 7 or the voice data already stored in the memory section 4, for example.

The clock 9 is configured of a timer circuit that contributes to a timekeeping operation and the like to be required in the control of the internal electric circuits in the camera unit 10. Note that the description of the present embodiment shows the example in which the clock 9 is configured as a single configuration block (see FIG. 3). Alternatively, the clock 9 may be included inside of the signal processing/control section 11.

The adapter communication section 12 is configured of a communication circuit for communicating with the wireless communication adapter 30 which is mounted and electrically connected to the camera unit 10. According to such a configuration, the image data, the various control instruction signals, and the like acquired by the camera system 1 are outputted to the wireless communication adapter 30 via the adapter communication section 12. Furthermore, the image data, the various control instruction signals, and the like received from the external apparatuses (other camera systems 1B, 1C, etc.) by the wireless communication adapter 30 are inputted to the signal processing/control section 11 of the camera unit 10 via the adapter communication section 12.

The lens communication section 14 is configured of a communication circuit for communicating with the photographing lens unit 20 which is mounted and electrically connected to the camera unit 10. According to such a configuration, the control instruction signals and the like from the signal processing/control section 11 of the camera unit 10 are transmitted to a lens drive control section 23 of the photographing lens unit 20 via the lens communication section 14.

The photographing lens unit 20 is configured of: a lens section 21 including a plurality of optical lenses that condense a luminous flux from a photographing target (object) and forms an image on a light-receiving surface of the image pickup section 2 and a lens holding frame for holding the optical lenses; the lens drive control section 23 that drives and controls the lens section 21, and a diaphragm mechanism, a shutter mechanism and the like which are not shown; and a lens side communication section 22 that communicates with the lens communication section 14 of the camera unit 10. Note that the camera unit 10 and the photographing lens unit 20 are electrically connected to each other via the contact portions 10*d*, 20*d* which are disposed to the respective units.

Other parts of the configuration of the photographing lens unit 20 are assumed to be substantially the same as those of the photographing lens unit applied to a digital camera of a conventional common configuration. Note that the photographing lens unit 20 may be configured in various ways, that is, the photographing lens unit 20 may be detachable with respect to the camera unit 10, or may be configured in an integrated manner with respect to the camera unit 10.

As described above, the wireless communication adapter 30 is detachably disposed with respect to the accessory shoe 10*b* provided on the top face of the camera main body 10*a*. When the wireless communication adapter 30 is mounted to the camera main body 10*a*, the wireless communication adapter 30 and the camera main body 10*a* are electrically connected to each other. When the wireless communication adapter 30 and the camera main body 10*a* are electrically connected to each other, the wireless communication adapter 30 wirelessly communicates with the external apparatuses (other camera systems 1B, 1C and the like) under the control of the signal processing/control section 11 of the camera unit 10.

Therefore, the wireless communication adapter 30 includes inside thereof an adapter control section 31, a wireless communication section 34, an adapter side communication section 32 and the like.

The adapter side communication section 32 is a circuit section that communicates with the adapter communication section 12 of the camera unit 10 to transmit and receive image data, various information data, control instruction signals and the like.

The adapter control section 31 is a control circuit that controls the wireless communication section 34 and the like based on the control signals inputted from the camera unit 10 via the adapter side communication section 32.

The wireless communication section 34 is a circuit section that carries out wireless data communication with the external apparatuses (other camera systems 1B, 1C and the like) under the control of the adapter control section 31.

The camera system 1 (photographing apparatus) according to the present embodiment further includes various components other than the components described above. However, the components other than those described above are not directly related to the present invention. In order to avoid the complication of the drawings, illustrations of the components other than those described above are omitted, and it is supposed that such components have the same configurations as those used in a camera system (photographing apparatus) including a conventional digital camera and detailed descriptions thereof will be omitted.

Next, description will be made on an overview of the working of the photographing system in which photographing is performed by using a plurality of camera systems (photographing apparatuses) 1 according to the present embodiment configured as described above, with reference to FIGS. 4, 5A to 5C, 6A and 6B.

When a desired object is photographed by the camera system 1 according to the present embodiment, the camera system 1 is configured to be able to photograph the same object cooperatively with the other camera systems 1B, 1C which are fixedly arranged at other positions as external apparatuses. In the description below, the camera system operated by the photographer is referred to as a first camera system (first photographing apparatus) 1A. In addition, the camera systems 1B, 1C used fixedly arranged at other positions are referred to as a second camera system (second photographing apparatus) 1B and a third camera system 1C. Though the respective components of the first camera system 1A, the second camera system 1B and the third camera system 1C are attached with the same reference numerals, these components are discriminated as needed by appropriately referring to "a first image pickup section 2", "a second image pickup section 2" and the like.

As an example of a usage pattern at the time that a photographing operation is performed by using the camera system 1 of the present embodiment and also photographing is performed cooperatively with the other camera systems 1B, 1C, description will be made below assuming a scene of a footrace in an athletic meet, for example.

As shown in FIG. 4, a photographer 102 who holds and operates the first camera system 1A waits at an arbitrary point A (see the reference sign [A] in FIG. 4) along a course 101, for example. At the same time, the second camera system 1B as the second photographing apparatus is fixedly arranged using a tripod stand and the like at an arbitrary point B (see the reference sign [B] in FIG. 4) which is located along the course 101 and rearward of the point A. Furthermore, the third camera system 1C as the third photographing apparatus is fixedly arranged similarly, using a tripod stand and the like at an arbitrary point C (see the reference numeral [C] in FIG. 4) which is located along the course 101 and rearward of the point B.

The second and the third camera systems 1B, 1C, which are fixedly arranged cameras, are the systems having substantially the same configuration as that of the first camera system 1A and operate in association with the photographing operation of the first camera system 1A. Note that in the example shown in FIG. 4, the two cameras, that is, the second and the third camera systems 1B, 1C are fixedly arranged. However, the present embodiment is not limited to such a configuration, and it is sufficient to prepare at least one camera system to be fixedly arranged other than the first camera system 1A held by the photographer 102. In addition, in the example shown in FIG. 4, the first camera system 1A is held by the photographer and the second and the third camera systems 1B, 1C are fixedly arranged using the tripod stands. However, the present embodiment is not limited to such a configuration, and the camera systems other than the first camera system 1A may be held by other photographers, for example.

In such a situation, it is assumed that an object 100 comes running the course 101 toward the direction shown by the arrow X as shown in FIG. 4 At this time, the photographer 102 waits for a shutter chance at the point A beside the course 101, and when the object 100 comes close, the photographer 102 performs a shutter-release operation, that is, the photographing operation at an arbitrary timing. According to such an operation, a series of images as shown in FIGS. 5A and 5B, for example, can be acquired. Note that FIG. 5B shows an example of an image acquired when the object 100 passes in front of the photographer 102.

Based on the image data thus acquired, the first camera system 1A performs a signal processing such as face detection of the desired object 100 to acquire information of a face region F1 (see FIG. 5A) in the photographed image. Such information is temporarily stored in an internal storing section (not shown; an internal memory and the like in the signal processing/control section 11, for example) in the first camera system 1A and transmitted to the second and the third camera systems 1B, 1C as the information related to the image acquired by the photographing operation.

Thus, a plurality of images are acquired until the object 100 passes through the point A where the photographer 102 is located. However, in an ordinary case, the photographer 102 can perform the photographing operation at an arbitrary one point A using only one first camera system 1A. Therefore, the shutter chance is limited to a very short time period, and it is only a few images photographed at the one point A that the photographer can acquire during the limited time period.

Therefore, the first camera system 1A according to the present embodiment transmits to the other camera systems (1B, 1C) which are fixedly arranged in advance the information based on the acquired image data, specifically, the face image information of the desired object 100 acquired using the face detection function almost simultaneously with the photographing operation. The second and the third camera systems 1B, 1C receive the information and uses the information at the time of photographing operation, thereby capable of acquiring the photographing results from more various viewpoints.

That is, the second and the third camera systems 1B, 1C which receive the information transmitted from the first camera system 1A share the face image information, the composition information, the time information and the like acquired by the first camera system 1A at the time of photographing operation That is, the second and the third camera systems 1B, 1C automatically perform the shutter-release operation, when the object 100 matching the face image information by the face detection function enters within a photographing range and becomes a predetermined size, for example, based on the various information related to photographing such as the received face image information. According to such a configuration, based on the information acquired at the time of photographing by the first camera system 1A, the second and the third camera systems 1B, 1C can subsequently perform the same photographing operation on the object 100 who has passed in front of the photographer 102 at the point A. For example, the second camera system 1B automatically performs a photographing operation based on the information acquired from the first camera system 1A, when the object satisfies predetermined conditions. The image acquired by such an operation is, as shown in FIG. 5C, similar to the image shown in FIG. 5A which is acquired by the first camera system 1A. However, the image is viewed from another point, that is, the image includes different background and the like (though not shown in FIGS. 5A to 5C) with the object 100 set as a main object.

A brief overview of a series of flows of the above-described working along the time axis is shown in FIGS. 6A and 6B. First, as shown in FIG. 6A, the first camera system 1A is operated voluntarily by the photographer 102 at the point A (see FIG. 4) to acquire a plurality of images [a-1], [a-2], [a-3], and [a-4]. After a series of photographing operation, the first camera system 1A performs various predetermined signal processings based on the plurality of acquired image data to acquire various information.

The information acquired at this time includes, for example, information (information on face, hair style, clothes) by which the object 100 as a main figure in the image and a desired object to be photographed is specified and the size (at the time of starting photographing, and at the time of terminating photographing) of the object 100 occupying the image. The above-described information is acquired from the time point when the photographing is started using the first camera system 1A as the first photographing apparatus. For example, in a case where the face detection function is used, once the face of the main figure (object 100) as a target is detected, even if the detected face moves in the image after the detection, there is a function for following the face. Therefore, once a face of a figure is detected by the face detection function, other information on the figure is acquired as needed, from the image data in the image region including the detected face, while following the detected face. Even if the information registered in advance for face detection function only includes a frontal view of the face, for example, after the face detection is performed based on the registered information and the face is detected, the detected face is followed, thereby enabling information on feature of the face of the object 100 viewed from different angles other than front to be newly acquired.

Here, description will be made assuming that the photographer 102 who holds the first camera system 1A acquires four images shown by the reference signs [a-1] to [a-4] in FIG. 6A at the point A under the situation shown in FIG. 4. These four images [a-1] to [a-4] show the state in which the figures including the object 100 come closer to the photographer 102 (point A) with the elapse of time. It is assumed that the image [a-1] is the image (photographing start image) of immediately after the start of photographing, the images [a-2] and [a-3] are photographed in the order of time series, and finally the image [a-4] (photographing termination image) is photographed.

In the images [a-1] [a-2] just after the photographing start, a plurality of figures including the object 100 are running at the position which is relatively far from the point A of the photographer 102, and the region occupied by the object 100 in the photographing range is relatively small and also other runners are included in the images. However, when looking at the compositions of the images [a-1] and [a-2], the main object is the figure FIG. 4 shown by the reference numeral 100.

In the subsequent images [a-3], [a-4], the object 100 comes close to the point A of the photographer 102, and the region occupied by the object 100 in the photographing range is large.

From the four images shown in FIG. 6A and the image data shown in FIG. 5B, the first camera system 1A can acquire various information related to photographing such as: feature information of the main object 100 including face image information, side face image information and clothes information; information related to the composition intended by the photographer 102; and information related to the sizes of the main object (the size of the object region shown in the photographing range) at the time of photographing start and photographing termination.

Various information thus acquired is automatically transmitted from the first camera system 1A to the second and the third camera systems 1B, 1C, and used when the second and the third camera systems 1B, 1C perform photographing operation.

That is, the second and the third camera systems 1B, 1C detect the same object 100 as the object 100 photographed by the first camera system 1A, based on the various information from the first camera system 1A, and set the detected object 100 as a photographing target.

That is, when receiving the various information from the first camera system 1A (see "information reception" in FIG. 6B), the second and the third camera systems 1B, 1C perform various settings on the respective systems based on the various information, and stand by while waiting for a timing for automatically carrying out the shutter release operation. When the object 100 comes running the course 101 toward the points B and C, the face detection of the object 100 in the image is performed, and the size of the figure having the detected face is checked. When the object 100 has a predetermined size, for example, the object 100 matches the conditions based on the information on the size of the object 100 and the composition in the image [a-1] at the time that the first camera system 1A starts photographing, the second and the third camera systems 1B, 1C start photographing operation. In addition, also regarding at which time point the photographing operation is terminated, the second and the third camera systems 1B, 1C terminates the photographing operation at an optimal timing with reference to the various information at the time that the first camera system 1A terminates the photographing ("photographing satisfying condition" in FIG. 6B).

The images thus acquired by the second and the third camera systems 1B, 1C are like the images [b-1], [b-2] in FIG. 6B. For example, the image [b-1] is an example of an image acquired at the time of photographing start. The image [b-1] corresponds to the image [a-1], etc., acquired by the first camera system 1A. Furthermore, the image [b-2] is an example of an image acquired at the time of photographing termination. The image [b-2] corresponds to the image [a-4], etc., acquired by the first camera system 1A.

If the camera systems having substantially the same configuration as that of the first camera system 1A are used as the second and the third camera systems 1B, 1C, the second and the third camera systems 1B, 1C can perform substantially equivalent photographing operation based on the information from the first camera system 1A, thereby capable of acquiring desired images.

Alternatively, as another configuration different from that described above, for example, the range which can be photographed by the second and the third camera systems, that is, the angles of view of the photographing lenses may be set relatively larger than that of the photographing lens applied to the first camera system. In such a configuration, the second and the third camera systems can acquire the images having photographing ranges set wider, for example, the images [b-1a], [b-2a] and the like shown in FIG. 6B. Then the second and the third camera systems 1B, 1C perform signal processings based on various information transmitted from the first camera system, for example, the trimming processing, on the images [b-1a], [b-2a] and the like, thereby capable of acquiring the images [b-1], [b-2] and the like shown in FIG. 6B.

Finally, the second and the third camera systems 1B, 1C transmit the acquired series of image data to the first camera system 1A.

Next, description will be made below on the flow of the working of the photographing system in which photographing is performed using a plurality of camera systems (photographing apparatuses) 1 according to the present embodiment, with reference to the flowchart in FIG. 7.

First, the user (photographer) turns on a power supply on/off operation member (not shown) among the operation members of the camera unit 10 in the first camera system 1A which is in a power-supply off state. In response to such an operation, the first camera system 1A is activated and a processing sequence for camera control in FIG. 7 is started (START). At the same time, also the second and the third camera systems 1B, 1C as the fixedly arranged cameras are brought into a power-supply on state in which photographing operation can be carried out (photographing standby state).

Note that, in the flowchart in FIG. 7, the working of the camera system 1 according to the present embodiment is described. However, as described above, the camera systems having substantially the same configuration can be used as the first, the second, and the third camera systems 1A, 1B, and 1C. In the present embodiment, the first camera system 1A is a camera system (photographing apparatus) which is operated by the photographer and transmits the various information related to photographing. On the other hand, the second and the third camera systems 1B, 1C are camera systems (photographing apparatuses) which function as the fixedly arranged cameras and receive the various information related to photographing.

Among the processing steps in FIG. 7, (1) The processing steps S101 to S109, S131 and S132 are the processing steps in a photographing operation mode (moving image photographing mode) when the camera unit 10 is operated as a part of the first camera system;

(2) the processing steps S121, S122 are image data reception processing steps, when the camera unit 10 is operated as a part of the first camera system;

(3) the processing steps S111 to S119 are the processing steps in the photographing operation mode (still image photographing mode) when the camera unit 10 is operated as a part of the second and the third camera systems; and (4) the processing steps S141 to S145 are the processing steps in the reproduction operation mode common to the camera systems.

First, the brief overview of the processing sequence in the photographing operation mode in the first camera system is as follows. That is, in the step S101 in FIG. 7, the signal processing/control section 11 of the first camera system 1A confirms whether or not the currently set operation mode is the photographing operation mode in which the photographing operation can be carried out.

Note that operation modes of a general digital camera includes a still image photographing mode in which still image data is acquired and a moving image photographing mode in which moving image data is acquired. Also the camera system 1 according to the present embodiment includes the still image photographing mode and the moving image photographing mode. Now, description will be made assuming that the first camera system 1A held by the photographer performs photographing in "the moving image photographing mode", while the second and the third camera systems 1B, 1C as fixedly arranged cameras perform photographing in "the still image photographing mode" in the present embodiment.

However, in the camera systems (photographing apparatuses) of the present embodiment, even if the camera systems are operated either in the still image photographing mode or the moving image photographing mode, the camera systems work in the same way as described below.

In the processing in the step S101, when the photographing mode is confirmed to be set to either the still image photographing mode or the moving image photographing mode, the processing proceeds to the next step S102. On the other hand, when the photographing operation mode is not set, the processing proceeds to step S141 supposing that the operation mode is set to another operation mode.

In the step S102, the signal processing/control section 11 controls the first image pickup section 2, the display section 8 and the like to carry out a live view image display processing for displaying a live view image on a display screen of the display section 8. After that, the processing proceeds to the step S103.

In the step S103, the signal processing/control section 11 monitors instruction signals from the operation determination section 6 and confirms whether or not a photographing operation instruction signal for starting the photographing operation is generated. When the photographing operation instruction signal is confirmed (that is, when the camera unit 10 is operated as a part of the first camera system 1A), the processing proceeds to the next step S104. On the other hand, the photographing operation instruction signal is not confirmed (that is, the camera unit 10 is operated as a part of the second and the third camera systems 1B, 1C), the processing proceeds to the step S111.

In the step S104, the signal processing/control section 11 controls the image pickup section 2, the display section 8, the memory section 4 and the like, to start an ordinary photographing processing. Note that the ordinary photographing processing performed in this step by the first camera system 1A is the moving image photographing processing, as described above. Though detailed description of the moving image photographing processing will be omitted, the processing is an ordinary moving image acquiring operation performed by driving the image pickup section 2 and the like, and includes various setting operation related to moving image photographing such as AE control, AF control, AWB control and the like. After that, the processing proceeds to the step S105.

In the step S105, the signal processing/control section 11 performs a signal processing based on the moving image data acquired in the processing in the step S104. Then, the signal processing/control section 11 confirms whether or not the various information such as the face image information on the figure and the composition information in the photographed image exist in the acquired image data.

Specifically, the face image information includes face type information acquired as a result of comparison between the acquired image and a plurality of face libraries stored in advance in the memory section 4, and information on the ratio of the distances among a plurality of parts in the photographed face. Based on such information, it is possible to determine what kind of feature the photographed face has. The face image information may be information acquired by quantifying the sizes and shapes occupied by the parts representing the colors of the skin and hair at the upper portion of the face in the screen, and the like.

In addition, the composition information is the information on the coordinate and the size of the face occupying the screen.

When the face image information is acquired by the face detection section 11b, it is possible to accurately determine which face the photographer desires to photograph by prioritizing the face located at the center of the screen. In addition, it is possible to transmit correct image information in which the intention of the photographer is also taken into consideration, by transmitting the face image information at the photographing timing.

When the various information is confirmed, the processing proceeds to the step S106, and in the step S106, the various information is temporarily stored in the internal storing section such as the internal memory of the signal processing/control section 11, for example (information accumulation processing). After that, the processing proceeds to the step S107. When the various information is not confirmed, the processing proceeds to the step S107.

In the step S107, the signal processing/control section 11 monitors instruction signals from the operation determination section 6 to confirm whether or not the operation for terminating the photographing operation has been performed. When the photographing termination operation is confirmed, the processing proceeds to the next step S108. In addition, when the photographing termination operation is not confirmed, the processing returns to the step S104 and repeats the processings in and after the step S104.

In the step S108, the signal processing/control section 11 controls the wireless communication adapter 30 connected to the camera unit 10 via the adapter communication section 12 and confirms whether or not the state of wireless connection state is established between the first camera system 1A and the second and the third camera systems 1B, 1C. Note that the wireless connection processing between the camera systems is not directly related to the present invention. Therefore, detailed description of the processing will be omitted assuming that the same wireless connection processing as that between ordinary electronic devices is performed.

However, when there are many relevant communication partner apparatuses, as shown in FIG. 4, the apparatuses (1B, 1C) located nearby and facing in the same direction as that of the apparatus 1A may be determined using GPS information acquired by the position determination section and the orientation determination section that determines the orientation in which the cameras face, to thereby preferentially establish communication with the determined apparatuses. Note that, when another photographer exists at the same position as that of the camera 1A, there is no point in communicating with the camera held by the other photographer, the camera 1A preferentially communicates with an apparatus located 10-20 meters away from the camera 1A, for example. The distance may be switched depending on focal lengths of the respective cameras 1B, 1C. For example, when the lens with a focal length of 28 millimeters is used, it is quite difficult to discriminate figures at 5.6 meters away, that is, a distance of 200 times of the focal length. However, when a lens with a focal length of 200 millimeters is used, a distance of 200 times of the focal length is 40 meters. Thus, a communication partner apparatus may be selected using a distance of 200 times of the focal length of the lens mounted to the apparatus as a rough standard.

When the wireless connection state establishment between the first camera system 1A and the other camera systems (1B, 1C) is confirmed, the processing proceeds to the next step S109. When the wireless connection state between the camera systems is not confirmed, the processing proceeds to step S131.

In the step S109, the signal processing/control section 11 performs an information transmission processing for transmitting the data of the various information temporarily stored in the processing in the step S106 to the other camera systems (1B, 1C) via the wireless communication adapter 30. The information transmission processing is performed such that the wireless communication section 34 is controlled by the adapter control section 31 of the wireless communication adapter 30 under the control by the signal processing/control section 11 of the camera unit 10. The data of the various information transmitted in the processing is the information which is received by the other camera systems (1B, 1C) in the processing in the step S111 to be described later. Note that also the information transmission processing is not directly related to the present invention. Therefore, detailed description thereof will be omitted assuming that the information transmission processing is the same as an ordinary information transmission processing. After that, the processing proceeds to the step S131.

In the step S131, the signal processing/control section 11 monitors instruction signals from the operation determination section 6 to confirm whether or not the power-supply off operation has been performed. When the power-supply off operation is confirmed, the processing proceeds to the next step S132. When the power-supply off operation is not confirmed, the processing returns to the above-described step S101 and repeats the processings in and after the step S101.

In the step S132, the signal processing/control section 11 receives an power-supply off instruction signal from the operation determination section 6, to perform power-supply off processing for turning off the main power supply of the first camera system 1A. Then, the control sequence of the first camera system 1A is terminated.

Note that the first camera system 1A is brought into the power-supply off state, when the user (photographer) performs the power supply off operation in the processings in the steps S131 and S132. However, in the present embodiment, as described later, after the photographing operation is performed by the second and the third camera systems 1B, 1C, the image data acquired by these camera systems (1B, 1C) are transmitted to the first camera system 1A (see the processing in the step S118). Therefore, in the assumed usage, the first camera system 1A is set in a reception standby state, that is, an activated state without performing power-supply off operation also after the termination of the photographing operation.

Next, the brief overview of the processing sequence in the photographing operation mode of the second and the third camera systems will be described below.

When photographing operation has not been confirmed for a predetermined time period in the state where the camera system is activated (processing in the step S103), the signal processing/control section 11 monitors the wireless communication section 34 and the like of the wireless communication adapter 30 to confirm whether or not the various information related to a photographing result has been received from the first camera system 1A in the step S111. Note that the predetermined time period in this case is confirmed by checking an output signal of the clock 9.

That is, when the photographing operation is performed in the processing in the above-described step S103, it is determined that the camera is the first camera system 1A operated by the photographer. On the other hand, when the photographing operation is not performed in the processing in the step S103, it is determined that the camera system is the fixedly arranged second and the third camera systems 1B, 1C, and the processing proceeds to the step S111.

When the reception of the various information data is confirmed (in other words, when the camera unit 10 is operated as a part of the second and the third camera systems 1B, 1C) in the processing in the step S111, the processing proceeds to the next step S112. The various information data received in the processing is the information transmitted in the processing in the step S109. When the reception of the various information data is not confirmed (that is, when the camera unit 10 is operated as a part of the first camera system 1A), the processing proceeds to the step S121.

The case in which the reception of the various information is not confirmed in the processing in the step S111 is assumed to be such a case that, when the camera unit 10 is operated as a part of the first camera system 1A, the first camera system 1A is in a power-supply on state and a standby state without the photographing operation being performed after the completion of the information transmission processing in the above-described step S109 (S131→S101, S102, S103→S111). In this case, the camera system is described as the first camera system 1A.

In the step S112, the signal processing/control section 11 performs an information memory processing for temporarily storing the received various information. The signal processing/control section 11 controls the condition setting section 11d to perform a setting processing of photographing conditions for the case where the automatic photographing operation is performed by the second and the third camera systems 1B, 1C based on the various information received and temporarily stored. Then, the processing proceeds to the step S113.

In the step S113, the signal processing/control section 11 controls the second image pickup section 2, the display section 8 and the like to start photographing operation processing. Such a photographing operation processing is assumed to be the still image photographing processing in the present embodiment, since the camera system is the second and the third camera systems 1B, 1C, as described above. Detailed description of the still image photographing processing will be omitted. The still image photographing processing is an ordinary still image acquiring operation to be performed by driving the image pickup section 2.

Among the photographing operation processings, the actual operation performed in the step S113 include various setting operation related to the still image photographing such as the AE control, the AF control, and the AWB control to be performed by driving the image pickup section 2, the processing for displaying a live view image on the display screen 8a of the display section 8, that is, the processing for monitoring the image in the photographing angle of view which can be photographed by the fixedly arranged camera systems (1B, 1C), and the actual release processing is not performed. Then the processing proceeds to the step S114.

Subsequently, in the step S114, the signal processing/control section 11 controls the condition determination section 11c to confirm whether or not the image signal (live view image) under the photographing operation matches the photographing conditions set by the condition setting section 11d, that is, whether or not a similar image matching the photographing start conditions (for example, the image similar to the photographing start image shown by [a-1] in FIG. 4) is present. When the similar image of the photographing start image (for example, the image shown by [b-1] in FIG. 4) is confirmed to be present, the processing proceeds to the next step S115. When there is no similar image, the processing returns to the above-described step S113, and repeats the processings in and after the step S113.

In the step S115, the signal processing/control section 11 causes a photographing instruction signal to be generated according to the setting conditions based on the various information to start photographing operation at a predetermined timing determined through the condition determination section 11c. The photographing operation performed in this step is controlling the diaphragm and the shutter according to the photographing instruction signal to carry out the actual shutter release action and acquiring the output signal from the image pickup section 2 at the time of the shutter release as a still image.

When the composition becomes similar to the composition according to the photographing result of the first camera system 1A in processing in the above-described step S114, the second and the third camera systems 1B, 1C perform automatic photographing operation. According to such an operation, the image data of the similar image in which the various information (face image information, composition information and the like) related to the image acquired by the first camera system 1A are reflected is received by the second and the third camera systems 1B, 1C. After that, the processing proceeds to the step S116.

In the step S116, the signal processing/control section 11 confirms whether or not a similar image is present similarly as in the processing in the step S114. Every time a presence of a similar image is confirmed, the processing in the step S115 is repeated. If there is no similar image any more, the processing proceeds to the next step S117.

In the step S117, the signal processing/control section 11 performs a predetermined photographing termination processing to terminate the photographing operation. After that, the processing proceeds to the step S118.

In the step S118, the signal processing/control section 11 controls the wireless communication adapter 30 via the adapter communication section 12 to perform a transmission processing of the image data. The image transmission processing is performed in this step is the transmission processing from the second and the third camera systems 1B, 1C to the first camera system 1A. After that, the processing proceeds to the step S119.

In the step S119, the signal processing/control section 11 performs a memory clear processing on the internal memory and the like. After that, the processing proceeds to the step S131.

Subsequently, the brief overview of the image data reception processing sequence in the first camera system will be described below.

When the photographing operation has not been performed for a predetermined time period and the various information related to photographing is not received in the step S111, the processing proceeds to the step S121, and the image data reception processing sequence is performed in the step S121. Such a state is assumed to be the state where the first camera system 1A is in the standby state after performing the information transmission processing in the step S109.

That is, in the step S121, the signal processing/control section 11 monitors the wireless communication section 34 and the like of the wireless communication adapter 30 to confirm whether or not image data is received from the other camera systems. The image data received in this step is assumed to be the image data transmitted from the second and the third camera systems 1B, 1C in the image transmission processing in the step S118.

When the reception of the image data is confirmed, the processing proceeds to the step S122.

In the step S122, the signal processing/control section 11 performs a file connection processing for associating the received image data (image data acquired by the other camera systems (1B, 1C)) with the image data previously acquired and stored by the first camera system 1A. In this case, the signal processing/control section 11 functions as a memory control section. The file connection processing performed by the memory control section includes, for example, various image processings such as conversion of the data format for enabling a plurality of image data acquired by a series of photographing operation to be handled as integrated image data, or integrating reduced images based on the plurality of image data into one image data. The plurality of image data associated by the file connection processing is stored in the memory section 4. At that time, association information for associating the plurality of image data may be additionally written in a header portion and the like of each of the image data or only the association information may be stored in a separate file, for example. After the file connection processing has been performed, the plurality of image data acquired by a series of photographing operation is stored in the memory section 4. After that, the processing proceeds to the step S131. The processings in and after the step S131 are the same as those described above.

When the reception of the image data is not confirmed in the processing in the step S121, the processing proceeds to the step S131.

Finally, the brief overview of the processing sequence in the reproduction operation mode common to the camera systems according to the present embodiment will be described below.

When the operation mode is confirmed not to be set to the photographing operation mode in the processing in the step S101, the processing branches to the step S141. In the processings in and after the step S141, the processing sequence in the reproduction operation mode is performed.

That is, in the step S141, the signal processing/control section 11 checks the currently set operation mode again, and confirms whether or not the operation mode is set to the reproduction operation mode in which reproduction operation can be performed. When the operation mode is confirmed to be set to the reproduction operation mode, the processing proceeds to the next step S142. On the other hand, when the operation mode is confirmed not to be set to the reproduction operation mode, the processing proceeds to the step S101 and repeats the processings in and after the step S101.

In this case, description is made assuming that the operation modes of the camera system 1 are roughly divided into two operation modes, that is, "photographing operation mode" and "reproduction operation mode". It is needless to say that the case where the camera system 1 according to the present embodiment includes another operation mode other than the two operation modes can be considered. In that case, a processing sequence for confirming the other operation mode is similarly provided, as a branch of the processing in the step S141.

In the step S142, the signal processing/control section 11 controls the memory section 4, the display section 8 and the like to perform a file list display processing as to the image data already stored in the memory medium. After that, the processing proceeds to the step S143.

In the step S143, the signal processing/control section 11 monitors instruction signals from the operation determination section 6 to confirm whether or not selection operation of data file related to the image to be reproduced and displayed has been performed. When the selection operation of the data file is confirmed to have been performed, the processing proceeds to the next step S144. In addition, when the selection operation of the data file is confirmed not to have been performed for a predetermined time period, the processing proceeds to the step S145. Note that the predetermined time period in this case is confirmed by checking an output signal of the clock 9. After that, the processing proceeds to the step S144.

In the step S144, the signal processing/control section 11 controls the display section 8 and the like to perform a selected file reproduction display processing for reproducing and displaying the image based on the data file selected in the processing in the step S143. After that, the processing proceeds to the step S145.

In the step S145, the signal processing/control section 11 monitors instruction signals from the operation determination section 6 to confirm whether or not the termination operation of the reproduction operation has been performed. When the reproduction termination operation is confirmed, the processing proceeds to the step S131. In addition, when the reproduction termination operation is not confirmed, the processing proceeds to the step S142 and repeats the processings in and after the step S142.

Note that the specific processing contents of the processing sequence including the file list display processing (step S142), the file selection operation processing (step S143), the selected file reproduction processing (step S144) and the like are not directly related to the present invention. Therefore, description thereof will be omitted assuming that the same processings as those performed in a conventional photographing apparatus are performed.

As described above, according to the first embodiment, when the photographing operation of the first camera system 1A is started by a photographer, the various information (face image information, composition information and the like) related to the respective images are temporarily stored based on the image data acquired during the photographing operation, and after the termination of a series of photographing operation, the various information is transmitted to the second and the third camera systems 1B, 1C which are the other camera systems fixedly arranged at other points.

Then, the second and the third camera systems 1B, 1C set the photographing conditions based on the received various information, to determine the situation matching the set conditions, and automatically perform photographing (shutter release) at an appropriate timing. According to such a configuration, the photographer of the first camera system 1A can automatically acquire the data of images which reflect the photographer's intended photographing result (image data) and which are photographed from other points different from the location of the photographer by using the other camera systems fixedly arranged at other locations different from the location of the photographer.

When a series of photographing operation is performed by making the plurality of camera systems (1A, 1B and 1C) cooperative with one another, the photographer has only to operate the one camera system (1A). The photographer performs an ordinary photographing operation using the camera system (1A) operated by himself or herself, thereby capable of automatically acquiring a photographing result in which the photographer's intension is reflected by the other camera systems (1B, 1C) fixedly arranged at the other points.

In this case, the various information data transmitted from the first camera system 1A to the other camera systems (1B, 1C) when the plurality of camera systems perform a series of photographing operation only include extremely small volume information such as feature data acquired by the face detection function. Therefore, such information can be easily transmitted and received at high speed.

In addition, the image data (relatively large volume data) acquired by the other camera systems (1B, 1C) are transmitted to the first camera system 1A in an integrated manner after the series of photographing operation is terminated. Therefore, the data is surely transmitted and received without affecting the photographing operation.

Note that the first embodiment assumes the case where the first camera system 1A performs moving image photographing and the second camera system 1B performs still image photographing. However, the present invention is not limited to such a usage pattern, the form of the image data acquired by the respective camera systems (1A, 1B and 1C) may be either the still image or the moving image.

Incidentally, the first embodiment assumes the situation in which the photographer arbitrarily operates the first camera system 1A as the first photographing apparatus at an arbitrary point A to acquire a plurality of image data of the desired photographing target. In this case, description has been made on the specific example in which the photographer focuses on one photographing target (a specific one runner) among a plurality of photographing targets (a plurality of runners) and follows and photographs only the one photographing target.

In the example of use under such a situation, the object as the photographing target moves at a relatively high speed. Therefore, the respective camera systems can perform photographing operation for a relatively short time and acquire small amount of image data. Then, the respective camera systems works cooperatively with one another to acquire a series of image data.

Description will be made below on another usage pattern of the photographing apparatus (camera system) of the present invention as a second embodiment, assuming a situation different from the one assumed in the first embodiment.

Second Embodiment

The second embodiment of the present invention assumes scenes such as a school play or a music recital as another example of usage pattern of the photographing system in which photographing is performed using a plurality of camera systems. That is, in the scenes such as the school play and the music recital, a plurality of objects as photographing targets does not move. In such a situation, a photographer sometimes performs photographing while sequentially changing a photographing target by setting only a specific figure or another figure different from the specific figure as the photographing target among a plurality of photographing targets (a plurality of figures) or performing a zooming operation to photograph the whole stage. The present embodiment assumes photographing under such a situation.

The basic configuration of the photographing apparatus (camera system) of the present embodiment is exactly the same as that of the photographing apparatus of the first embodiment. Therefore, detailed description on the configuration will be omitted. In the description below, the respective components of the photographing apparatus (camera system) are attached with the same reference numerals as those used in the first embodiment.

Also in the present embodiment, the first camera system 1A held and operated by a photographer located at a certain point and the second camera 1B fixedly arranged at a point different from the point of the photographer are made cooperative with each other, to thereby enabling a series of related photographing. In the present embodiment, the other camera system is referred to as the second camera system 1B for simplification of the description. However, similarly as in the case of the first embodiment, a plurality of other camera systems may be used.

Figure 8:
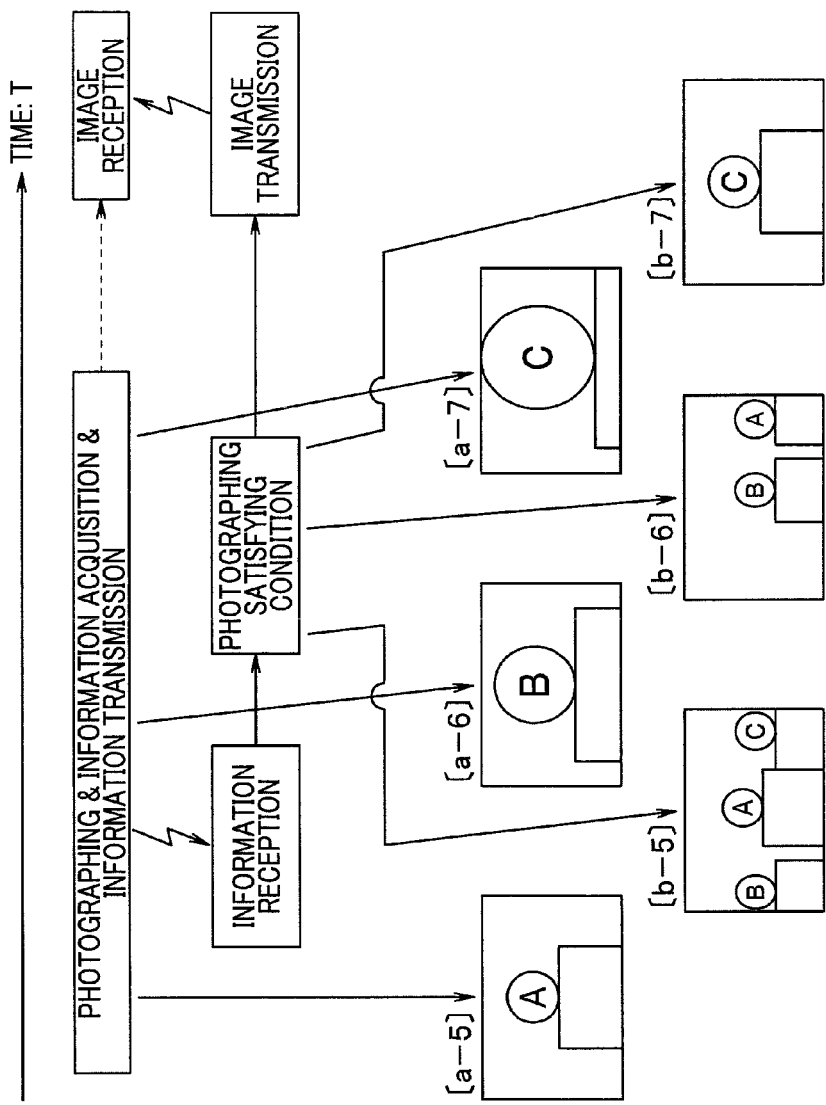
Figure 9:
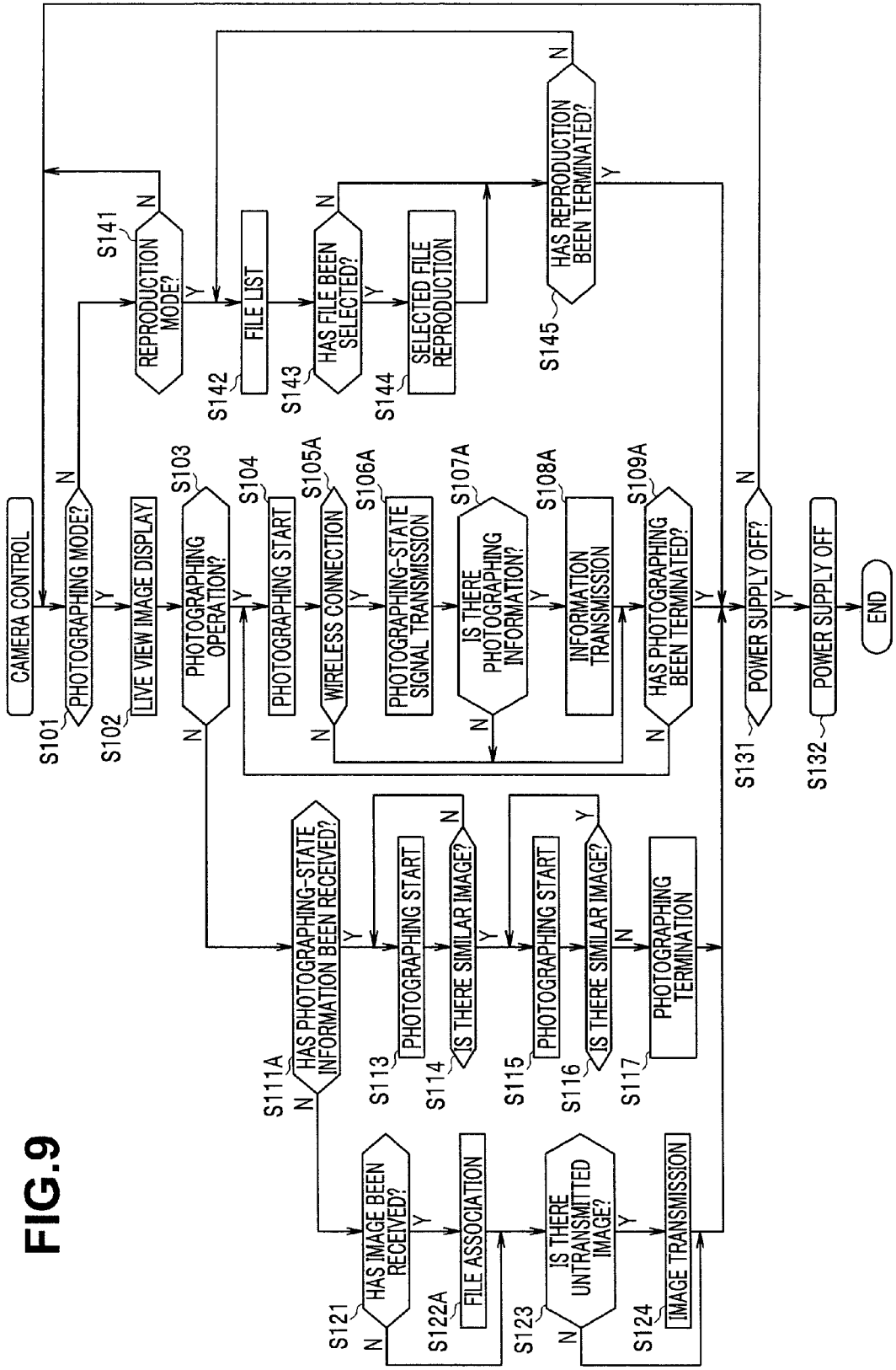
FIG. 9 is a flowchart showing a working of the photographing apparatus according to the second embodiment of the present invention.

FIGS. 8A, 8B and 9 are diagrams showing the working of the second embodiment of the present invention. Among these figures, FIGS. 8A and 8B are diagrams which show time charts showing the operations of the respective photographing apparatuses according to the present embodiment in an order of time series, and display examples of images based on image data acquired by the respective photographing apparatuses at the time of the respective operations in the time charts. FIG. 8A is a time chart showing the operation of the first photographing apparatus (first camera system) along the time axis. FIG. 8B is a time chart showing the operation of the second photographing apparatus (second camera system) along the time axis. FIG. 9 is a flowchart showing a working of the photographing apparatus according to the present embodiment.

First, in FIG. 8A, a photographer located at an arbitrary point operates the first camera system 1A, thereby sequentially acquiring a plurality of images [a-5], [a-6] and [a-7]. The image [a-5] is a display example of the image acquired as a result of photographing, in which the photographer focuses on a specific figure "A" among a plurality of photographing targets. The image [a-6] is a display example of the image acquired as a result of photographing after the photographing of the image [a-5], in which the photographer similarly focuses on another specific figure "B" among the plurality of photographing targets. The image [a-7] is a display example of the image acquired as a result of the photographing after the photographing of the image [a-6], in which the photographer similarly focuses on yet another specific figure "C" among the plurality of photographing targets.

In the case where a plurality of images are thus photographed by the first camera system 1A, acquisition of the various information related to each of the images and transmission processing of the various information are performed for each photographing operation of the images [a-5], [a-6] and [a-7] in the present embodiment.

The second camera system 1B receives the various information transmitted from the first camera system 1A for each transmission, and sets photographing conditions according to the received various information to sequentially perform photographing.

According to such a configuration, the images acquired by the second camera system 1B are like the images [b-5], [b-6] and [b-7] in FIG. 8B. For example, the image [b-5] corresponds to the image [a-5] acquired by the first camera system 1A, and is a display example of the image captured focusing on the specific figure "A" from the point where the second camera system 1B is located. The image [b-6] corresponds to the image [a-6] acquired by the first camera system 1A, and is a display example of the image captured with the specific figure "B" as a main object from the point where the second camera system 1B is located. The image [b-7] corresponds to the image [a-7] acquired by the first camera system 1A, and is a display example of the image captured with the specific figure "C" as the main object from the point where the second camera system 1B is located. These display examples show the examples in which the angle of view of the photographing lens of the second camera system 1B is set relatively larger than that of the photographing lens of the first camera system 1A, thereby capable acquiring the images on which a wider range of surrounding situation of the object is reflected, compared with the images acquired by the first camera system 1A. According to such a configuration, the images acquired by the second camera system 1B have compositions which are almost similar to those of the images acquired by the first camera system 1A, but have different photographing angles and changed angles of view, because the images are photographed from different points.

In addition, trimming processing and the like may be performed on the image data thus acquired, based on the various information such as the face image information and the composition information transmitted from the first camera system 1A. In this case, it is also possible to generate images which have compositions almost similar to those of the images acquired by the first camera system 1A, but photographed from a different viewpoint.

Thus, in the present embodiment, it is possible to acquire images, from different viewpoints, of a photographing target (the photographing target actually photographed by the first camera system 1A) specifically focused on among a plurality of photographing targets and desired to be photographed by the photographer.

Note that, also in the present embodiment, the image data acquired by the second camera system 1B are collectively transmitted to the first camera system 1A at the end of a series of photographing operation. The controls of the photographing assumed in the first embodiment and the photographing assumed in the second embodiment may be switched by changing the operation mode of the camera. Alternatively, the operation control of the second camera system may be switched with reference to the photographing conditions set by the condition setting section 11d of the signal processing/control section 11 based on the various information data acquired from the image data acquired by the first camera system.

The flow of the working of the photographing system in which photographing is performed by using a plurality of camera systems (photographing apparatuses) 1 according to the present embodiment is as shown in the flowchart in FIG. 9. The flowchart in FIG. 9 is substantially the same as the flowchart (FIG. 7) showing the working of the first embodiment, except for a part of processing steps. Therefore, in the description below, the same processing steps as those in the first embodiment are attached with the same step numbers and descriptions thereof will be omitted. Only different processing steps are detailed.

In FIG. 9, the processings in the step S101 to S104 are the same as those in FIG. 7 of the first embodiment.

In the step S104, the first camera system 1A starts the ordinary photographing processing, and thereafter proceeds to the next step S105A. In the step S105A, the signal processing/control section 11 confirms whether or not wireless connection state is established between the first camera system 1A and the second camera system 1B. This confirmation processing is the same as that in the processing in the step S108 in FIG. 7. That is, in the present embodiment, every time the photographing operation is performed in the first camera system 1A, the first camera system 1A performs wireless communication with the second camera system 1B, to transmit various photographing information.

In the step S105A, when the wireless connection state establishment between the first camera system 1A and the second camera system 1B is confirmed, the processing proceeds to the next step S106A. When the wireless connection establishment between the camera systems is not confirmed, the processing proceeds to the step S109A.

In the step S106A, the signal processing/control section 11 transmits an information signal indicating that the first camera system 1A is in a photographing state to the second camera system 1B. After that, the processing proceeds to step S107A.

The first camera system 1A transmits a "photographing-state signal", because the first camera system 1A is sometimes in a reception disabled state when the image data and the like are transmitted from the other camera system (1B) during the photographing operation. That is, when the image data is received, memory processing for storing the received image data is required. The memory processing is always required in the photographing operation. Therefore, if the photographing operation and the reception operation are carried out in parallel and the memory processings accompanying the respective operations are also carried out, the load would be increased.

Therefore, the first camera system 1A transmits "photographing-state signal" to the apparatus (the second camera system 1B) as a receiving side, during the photographing operation. This is a measure for preventing the other camera system (1B) from moving on to the image data transmission processing, when the other camera system as a wireless communication partner receives the "photographing-state signal" (see processing in the step S111A, S113 in FIG. 9 to be described later) from the first camera system 1A.

In the step S107A, the signal processing/control section 11 confirms whether or not the various information (face image information of the figure, or composition information in the photographed image) is present based on the image data acquired by the processing in the step S104. When the various information is confirmed, the processing proceeds to the next step S108A. On the other hand, when the various information is not confirmed, the processing proceeds to step S109A. The confirmation processing is substantially the same as the processing in the step S105 in FIG. 7.

In the step S108A, the signal processing/control section 11 performs an information transmission processing for transmitting the various information to the second camera system 1B via the wireless communication adapter 30. After that, the processing proceeds to the step S109A. The information transmission processing is substantially the same as the processing in the step S109 in FIG. 7. The various information data transmitted in the information transmission processing include plural data of the various information which are related respectively to a plurality of images acquired by the first camera system 1A in the first embodiment. However, the present embodiment is different from the first embodiment in that the various information data includes the various information related to one image data acquired immediately before the information transmission processing.

That is, in the present embodiment, for each series of photographing operation, the first camera system 1A transmits various information data based on the image data acquired by the most recent series of photographing operation to the second camera system 1B. According to such a configuration, even in a case where a photographing target to be focused is different in each photographing, the timing of photographing the same photographing target by the second camera system 1B is not missed.

Subsequently, in the step S109A, the signal processing/control section 11 monitors instruction signals from the operation determination section 6 to confirm whether or not a photographing termination operation has been performed. When the photographing termination operation is confirmed, the processing proceeds to the next step S131. When the photographing termination operation is not confirmed, the processing returns to the step S104, and repeats the processings in and after the step S104. The confirmation processing is the same as the processing in the step S107 in FIG. 7

When a camera system is activated and photographing operation has not been confirmed for a predetermined time period (processing in the step S103 in FIG. 7) and the processing proceeds to step S111A, it is assumed that the camera system is the second camera system 1B.

In this case, in the step S111A, the signal processing/control section 11 monitors the wireless communication section 34 and the like of the wireless communication adapter 30 to confirm whether or not the "photographing-state signal" is received from the first camera system 1A which is in the photographing operation state. When the reception of the "photographing-state signal" is confirmed, various information data to be subsequently transmitted (data transmitted by the processing in the step S108A in FIG. 9) is also received. After that, the processing proceeds to the next step S113. On the other hand, when the reception of the various information is not confirmed, the processing proceeds to the step S121.

The processings in the subsequent steps S113, S114 are the same as those in the same steps in FIG. 7. Then, in the step S115, the signal processing/control section 11 carries out a photographing operation processing (actual release processing). After that, the processing proceeds to the step S116. The processings in the step S116 and the next step S117 are the same as those in the same steps in FIG. 7. After that, the processing proceeds to the step S131. The processings in the step S131 and the next step S132 are the same as those in the same steps in FIG. 7.

When the reception of various information data is not confirmed in the processing in the step S111A and the processing proceeds to the step S121, confirmation is made as to whether or not image data has been received in the step S121. When the reception of image data is not confirmed, the processing proceeds to the step S123. On the other hand, when the reception of image data is confirmed, the processing proceeds to step S122A.

In this case, the reception operation of the image data is to be performed by the first camera system 1A. That is, when the reception of image data is confirmed in the processing in the step S121, the camera unit operates as the first camera system 1A. When the reception of image data is not confirmed by the processing in the step S121, the camera unit operates as the second camera system 1B.

When the camera unit operates as the first camera system 1A, in the step S122A, the signal processing/control section 11 performs a memory processing of the received image data, and a file association processing for associating the received image data with the image data previously acquired by the first camera system 1A. The file association processing is substantially the same as the file connection processing in the step S122 in FIG. 7 in the first embodiment. After that, the processing proceeds to step S123.

On the other hand, when the reception of image data is not confirmed in the step S121 and the processing proceeds to the step S123, the signal processing/control section 11 confirms whether or not there is untransmitted image data among the image data to be transmitted, in the step S123. The case where there is untransmitted image data is assumed to be a case where the second camera system 1B receives the "photographing-state signal" in the step S111A and the image data could not be transmitted from the second camera system 1B to the first camera system 1A, for example.

Therefore, in the working of the second camera system 1B in this case, after no reception of the "photographing-state signal" was confirmed in the step S111A, the processing proceeds to the step S121. In the step S121, the second camera system 1B is the transmission-side system which transmits image data, so that the processing proceeds to the step S123.

When a presence of untransmitted image data is confirmed in the step S123, the processing proceeds to the next step S124.

In the step S124, the signal processing/control section 11 controls the wireless communication adapter 30 via the adapter communication section 12, to carry out a transmission processing of the untransmitted image data. The image transmission processing carried out in this step is the image data transmission processing from the second camera system 1B to the first camera system 1A. After that, the processing proceeds to the step S131, and the same processings in and after the step S131 are performed On the other hand, when there is no untransmitted image data in the step S123, the processing proceeds to the step S131. The processings in and after the step S131 are the same as those described above.

Note that the processings in the steps S141 to S145 are the same as those in the processing sequence in the reproduction operation mode in FIG. 7 in the first embodiment.

As described above, the second embodiment can provide the same effects as those in the first embodiment even under the situation and the photographing conditions which are different from those in the first embodiment.

In addition, also in the present embodiment, the form of the image data acquired when the photographing operation is performed using the camera systems (1A, 1B) may be either a still image or a moving image.

Third Embodiment

Next, a third embodiment of the present invention will be described. The third embodiment assumes a case where the photographing apparatus operated by a photographer (first camera system 1A) performs still image photographing and the fixedly arranged photographing apparatus (second camera system 1B) performs moving image photographing under the same situation as that described in the second embodiment (for example, scenes such as school play or a music recital are assumed).

The basic configuration of the photographing apparatus (camera system) of the present embodiment is also exactly the same as that of the photographing apparatus according to the first embodiment. Therefore, detailed description of the configuration of the photographing apparatus will be omitted, and the respective components of the photographing apparatus (camera system) of the present embodiment are attached with the same reference numerals as those used in the description of the first embodiment.

In addition, also in the present embodiment, the camera system held by the photographer is referred to as the first camera system 1A and other camera system is referred to as the second camera system 1B for simplification of the description. Similarly as in the cases of the first and second embodiments, a plurality of other camera systems may be provided.

Figure 10:
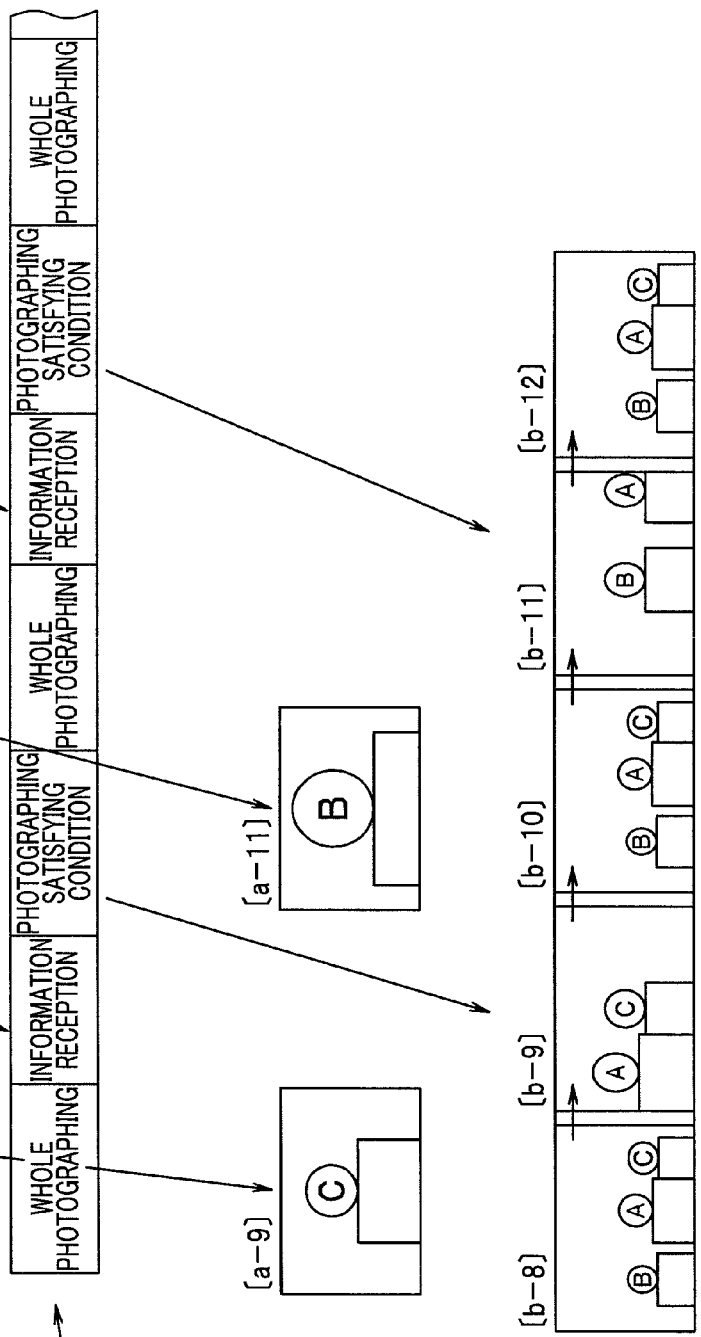
Figure 11:
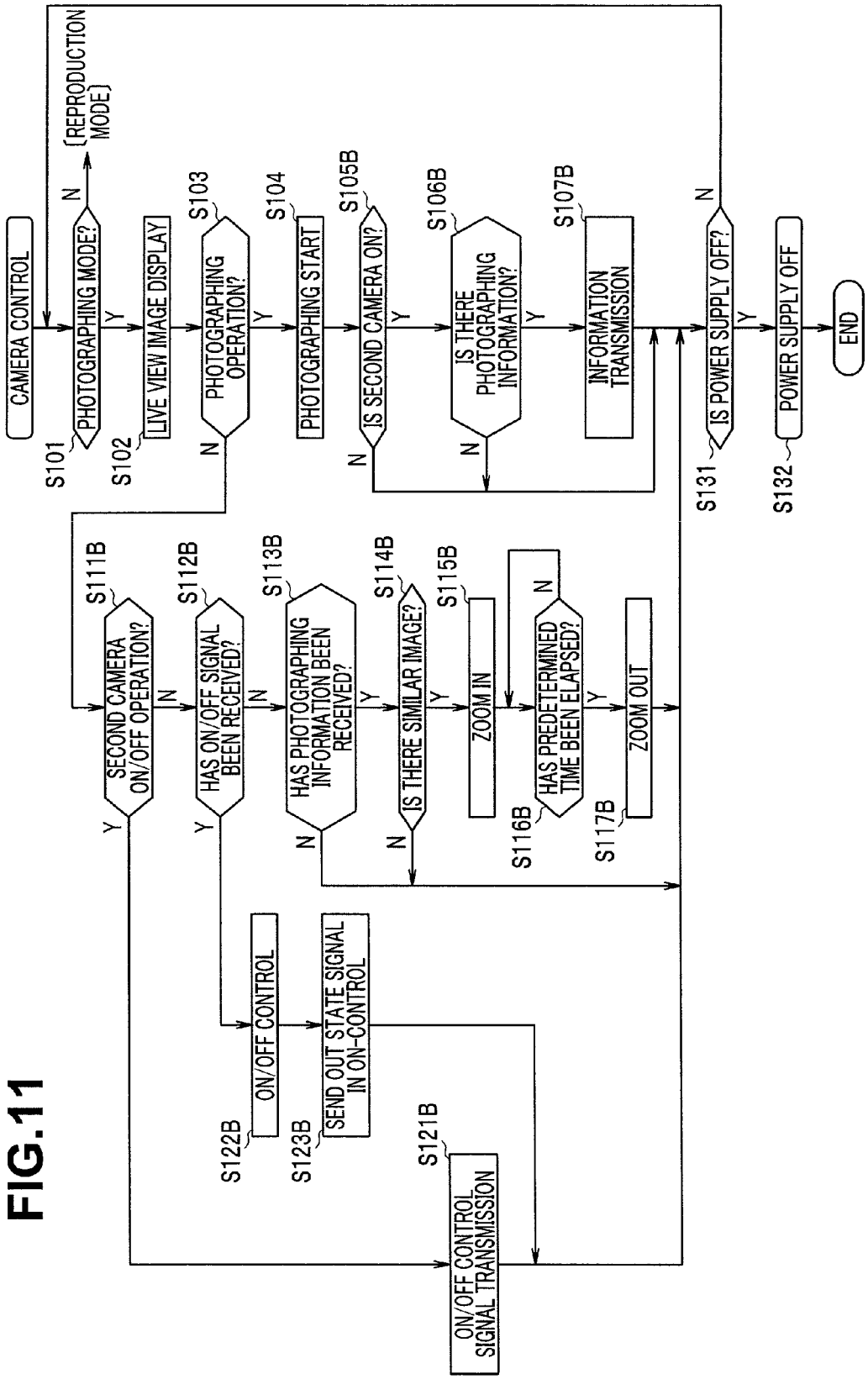
FIG. 11 is a flowchart showing a working of the photographing apparatus according to the third embodiment of the present invention.

FIG. 10A, FIG. 10B and FIG. 11 are diagrams showing the working of the third embodiment of the present invention. Among these figures, FIGS. 10A and 10B are diagrams which show time charts showing, in an order of time series, operations of photographing apparatuses of the present embodiment, and display examples of images based on image data acquired by the respective photographing apparatuses at the time of the respective operations in the time charts. Note that FIG. 10A is a time chart showing the operation of the first photographing apparatus (first camera system) along the time axis. FIG. 10B is a time chart showing the operation of the second photographing apparatus (second camera system) along the time axis. FIG. 11 is a flowchart showing the working of the photographing apparatus (camera system) of the present embodiment.

First, in FIG. 10A, a photographer located at an arbitrary point operates the first camera system 1A, to sequentially acquire a plurality of images [a-9], [a-11]. The image [a-9] is a display example of the image acquired as a result of photographing, in which the photographer focuses on a specific figure "C" among a plurality of photographing targets. The image [a-11] is a display example of the image acquired as a result of the photographing after the photographing of the image [a-9], in which the photographer similarly focuses on another specific figure "B" among the plurality of photographing targets.

In the case where a plurality of still images are thus photographed by the first camera system 1A, various information related to each of the images is received and transmitted for each photographing operation of the images [a-9] and [a-11] in the present embodiment, similarly as in the case of the second embodiment.

The second camera system 1B fixedly arranged at a predetermined position has a photographing lens, the angle of view of which is set such that a relatively large range can be photographed in an ordinary state. Specifically, the setting of the angle of view is such that the whole stage can be photographed in one screen in the case where the scenes like a school play or a music recital are assumed, for example.

In the present embodiment, the second camera system 1B normally performs continuous moving image photographing. When the second camera system 1B receives various information transmitted from the first camera system 1A during the moving image photographing, angle of view control such as zoom-in operation is performed on a photographing target specified based on the received various information. When a predetermined time has elapsed after the zoom-in operation based on the received various information, a zoom-out operation is performed and ordinary whole photographing is performed.

According to such a configuration, the moving images acquired by the second camera system 1B are like the images [b-8], [b-9], [b-10], [b-11], [b-12] and the like in FIG. 10B. Note that the image data acquired by the second camera system 1B is moving image data, as described above. Therefore, each of the images [b-8], [b-9], [b-10], [b-11] and [b-12] which are illustrated as still images in FIG. 10B is a view of the one image taken out from a plurality of images representing a moving image, for example, and shown as a still image.

The images [b-8], [b-10] and [b-12] show the images acquired when the whole scene is viewed from the position where the second camera system 1B is fixedly arranged.

The image [b-9] corresponds to the image [a-9] acquired by the first camera system 1A, and is a display example when the zoom-in operation is performed focusing on the specific figure "C" from the position where the second camera system 1B is fixedly arranged. After this state has been continued for a predetermined time period (for example, around 5 seconds), the zoom-out operation is performed to acquire the whole image [b-10].

Similarly, the image [b-11] corresponds to the image [a-11] acquired by the first camera system 1A, and is a display example when the zoom-in operation is performed focusing on the specific figure "B" from the position where the second camera system 1B is fixedly arranged. Then, after a predetermined time has elapsed, the zoom-out operation is performed in the state to acquire the whole image [b-12].

Note that still images may be taken out from the moving image data thus acquired, based on the various information such as the face image information and the composition information transmitted from the first camera system 1A, and trimming processing and the like may be performed on the still images. According to such processing, as for the still images of a desired object, in addition to the still images acquired by the photographing operation by the first camera system 1A, the still images from a different viewpoint of the same photographing target can be generated from the moving image data acquired by the second camera system 1B.

Next, the flow of the working of the photographing system in which photographing is performed by using a plurality of camera systems (photographing apparatuses) 1 according to the present embodiment is as shown in the flowchart in FIG. 11. Note that the same processing steps as those in the first embodiment are attached with the same step numbers, and descriptions thereof will be omitted. Only different processing steps will be detailed.

In FIG. 11, the processings in the steps S101 to S104 are the same as those in the same steps in FIG. 7 in the first embodiment.

The first camera system 1A starts an ordinary photographing processing in the step S104, and thereafter proceeds to the next step S105B. Then, the signal processing/control section 11 performs wireless communication with the second camera system 1B in the step S105, to confirm whether or not the second camera system 1B is in the power-supply on state. The result of the confirmation processing is used for determining whether or not the first camera system 1A transmits to the second camera system 1B the various information related to the image data acquired by the photographing operation. That is, when the second camera system 1B is confirmed to be in the power-supply on state, the processing proceeds to the next step S106B. In addition, when the second camera system 1B is not in the power-supply on state, the processing proceeds to the step S131.

Next, in the step S106B, the signal processing/control section 11 confirms whether or not the various information (the face image information of the figure, the composition information in the photographed image and the like) based on the image data acquired by the processing in the step S104 is present When the various information is confirmed, the processing proceeds to the next step S107B. In addition, when the various information is not confirmed, the processing proceeds to the step S131. The confirmation processing is substantially the same as each of the processings in the step S105 in FIG. 7 and in the step S107A in FIG. 9.

In the step S107B, the signal processing/control section 11 performs an information transmission processing for transmitting the various information to the second camera system 1B via the wireless communication adapter 30. The information transmission processing is substantially the same as each of the processings in the step S109 in FIG. 7 and in the step S108A in FIG. 9. Note that the various information data transmitted by the information transmission processing is the various information related to the one image data acquired immediately before the transmission processing similarly as in the case of the second embodiment.

Also in the present embodiment, for each series of photographing operation, the first camera system 1A transmits the various information based on the image data acquired by the most recent series of photographing operation to the second camera system 1B similarly as in the case of the second embodiment.

After that, the processing proceeds to the step S131. The processings in and after the step S131 are the same as those in the first embodiment.

Next, the working of the second camera system 1B is described below with reference to the processing sequence in and after the step S111B.

In the step S111B, the signal processing/control section 11 of the second camera system 1B monitors instruction signals from the operation determination section 6, to confirm whether or not the operation for turning on or off of the power supply has been performed. When the on/off operation has been confirmed, the processing proceeds to the step S121B.

In the step S121B, the signal processing/control section 11 performs wireless communication with the first camera system 1A, to transmit an on/off control signal to the first camera system 1A. After that, the processing proceeds to the step S131.

Details of the situation in this case will be described as follows. That is, in the processing in step S111B, when the on/off operation of the second camera system 1B has been confirmed, an on-signal or an off-signal is generated by the operation When the on-signal is generated, for example, the processing flow is as follows. First, an on-control signal is transmitted in the processing in the step S121B. After that, the processing returns to the step S101 via the step S131. Furthermore, the processing reaches the step S103 via the steps S101, S102.

In this case, the working of the fixedly arranged second camera system 1B is assumed, photographing operation by a photographer is not performed in the processing in the step S103. Therefore, in the processing in the step S103, the processing proceeds to the step S111B.

In the processing in the step S111B, the on/off operation is confirmed once again. However, in the processing in the step S111B, the on-operation has already been performed, so that the processing proceeds to the step S112B.

On the other hand, when an off signal is generated by the on/off operation in the processing in the step S111B, the processing flow is as follows. First, an off-control signal is transmitted in the processing in the step S121B. Then, the power-supply off operation is confirmed in the processing in the step S131, and thereafter the power-supply off processing is performed in the step S132, to terminate a series of processing sequence.

When the on/off operation has not been confirmed in the processing in the step S111B, the processing proceeds to the step 112B.

In this case, the second camera system 1B is confirmed to be in the on-state in the processing in the step S105B by the first camera system 1A, for example. Therefore, the on-state is assumed to be maintained also at this time point, so that the processing moves on to the next step S112B.

In the step S112B, the signal processing/control section 11 confirms whether or not the on/off signal has been received. The on/off signal in this case is the on/off control signal transmitted from the first camera system 1A. That is, the first camera system 1A is configured to be capable of remote-controlling the on/off operation of the second camera system 1B by using the wireless communication with the second camera system 1B.

When the reception of the on/off signal is confirmed, the processing proceeds to the step S122B. When the reception of the on/off signal is not confirmed, the processing proceeds to the step S113B In the step S122B, the signal processing/control section 11 performs on/off control of the second camera system 1B in response to the on/off signal received from the first camera system 1A in the processing in the above-described step 112B. After that, the processing proceeds to the step S123B.

In the step S123B, when the on/off control performed in the processing in the step S122B is the on-control, for example, the signal processing/control section 11 sends out a predetermined state signal representing the on-state of the second camera system to the first camera system 1A (the on-state signal is received by the first camera system 1A in the step S105B). Simultaneously, the second camera system 1B is activated under the control of the signal processing/control section 11, to be brought in the photographing standby state in which photographing operation can be performed, that is, the image pickup section 2, the display section 8 and the like are controlled and the control such as the live view image display processing is carried out. After that, the processing proceeds to the step S131.

When the reception of the on/off signal is not confirmed in the step S112B, the processing proceeds to the step S113B.

The case where the on/off signal is not received in the processing in the step S112B means the case where the remote control is not performed by the first camera system 1A. In this case, the first camera system 1A does not perform the transmission of the various photographing information in the processing in the step S107B. Therefore, the second camera system 1B does not receive the various photographing information in the processing in the step S113B to be described later, so that the second camera system 1B does not work cooperatively with the first camera system 1A, and the processing proceeds to the step S131.

When the reception of the on/off signal is not confirmed in the processing in the step S112B and the processing proceeds to the step S113B, the signal processing/control section 11 confirms whether or not the various photographing information has been received in the step S113B. The various photographing information received in this step is the various photographing information transmitted by the first camera system 1A in the processing in the step S107B. When the reception of the various photographing information is confirmed, the processing proceeds to the next step S114B. When the reception of the various photographing information is not confirmed, the processing proceeds to the next step S131.

In the step S114B, the signal processing/control section 11 confirms whether or not there is a similar image matching the received various information among the images acquired by the second camera system 1B. When a presence of a similar image is confirmed, the processing proceeds to the step S115B. When there is no similar image, the processing proceeds to the step S131.

In the step S115B, the signal processing/control section 11 controls the photographing lens unit 20 to carry out a zoom-in control processing according to the various information through the lens communication section 14. Then, in the next step S116B, the zoom-in state is maintained until a predetermined time has elapsed. After the predetermined time has elapsed, the processing proceeds to the step S117B. Subsequently, in the step S117B, a zoom-out control processing is performed to restore the original whole photographing state, and then the processing proceeds to the step S131.

Note that the processing sequence in the reproduction operation mode is the same as that in the first embodiment. Therefore, illustration and description of the reproduction operation mode in the present embodiment will be omitted.

As described above, according to the third embodiment, it is possible to acquire accurate moving image data using the second camera system 1B fixedly arranged in a stable state, and the photographer can freely move and arbitrarily select a specific photographing target from a plurality of photographing targets according to his or her interest, to acquire desired still images.

In addition, the various information related to the photographing target actually photographed by the photographer using the first camera system 1A is transmitted to the second camera system 1B, thereby enabling the various information to be shared by the camera systems. According to such a configuration, the second camera system 1B can perform the zooming operation with respect to the specific photographing target according to the various information acquired during the moving image photographing without the operation by an operator. Therefore, in the second camera system 1B, even in the fixedly arranged state without the operation by the operator, the control for variously changing the photographing angle of view is automatically performed according to the intention of the photographer. Thus, it is possible to acquire moving images with full of variety based on the moving image data acquired by the second camera system 1B.

Furthermore, in the second camera system 1B, it is possible to generate still images which contain the same photographing target as that in the still images acquired by the first camera system 1A but which are viewed from a different viewpoint based on the received various information and the moving image data acquired by photographing, by performing the signal processing such as the trimming processing.

Fourth Embodiment

In the above-described first, second and third embodiments, the second and the third camera systems which are made cooperative with the first camera system held by a photographer are described assuming a type of fixedly arranged camera using a tripod stand and the like.

However, the configuration of the other camera systems is not limited to the above-described example, and may be configured as described below, for example.

FIG. 12 is a schematic view showing a photographing apparatus according to the fourth embodiment of the present invention. The basic configuration of the camera system as the photographing apparatus according to the present embodiment is substantially the same as that of the photographing apparatus of each of the above-described embodiments. However, in the present embodiment, the configuration of the other camera system which is not operated by a photographer is a little different from that of the other camera system in each of the above-described embodiments. Therefore, in the description below, only the components having different configuration will be described. Detailed description of the same components as those in the above-described embodiments will be omitted and description will be made using the same reference numerals used in the above-described embodiments. Regarding the working when photographing is performed using the photographing apparatuses according to the present embodiment, the working of any of the above-described embodiments can be applied, so that description will be omitted.

The present embodiment assumes a configuration in which the first camera system (1A) operated by a photographer and a second camera system (1D) fixed to a tripod stand and the like are used cooperatively, similarly as in the cases of the above-described embodiments.

As shown in FIG. 12, the first camera system 1A is a photographing apparatus configured by combining a camera unit 10, (a photographing lens unit 20; not shown), and a wireless communication adapter 30.

Similarly, the second camera system 1D is a photographing apparatus configured by combining a camera unit 10, a photographing lens unit 20 and a lens-equipped wireless communication adapter 30A.

The lens-equipped wireless communication adapter 30A has a configuration for achieving exactly the same function as that of the wireless communication adapter 30, and is an extension adapter configured by mounting a sub-camera function.

Main components achieving the sub-camera function include a photographing lens that forms an optical image, and an image pickup section having an image pickup function capable of acquiring the optical image formed by the photographing lens as electric image data. The image data acquired by the image pickup section is transmitted to the camera unit 10 via the adapter side electric contact 30c, and the electric contact 10c. In the camera unit 10 which receives the image data, live view image display can be performed based on the image data.

Note that an omnidirectional lens configured to have a photographing angle of view set at about 360 degrees and to cover the entire circumference as a photographing range is applied as the photographing lens.

The second camera system 1D thus configured is placed and fixed on a movable tripod stand 40 which is configured to be rotatable along the direction of the arrow R shown in FIG. 12. The movable tripod stand 40 is driven and controlled by a control section of the camera unit 10 based on the various information received by the lens-equipped wireless communication adapter 30A.

According to such a configuration, the second camera system 1D enables the image data acquired by the camera function of the lens-equipped wireless communication adapter 30A to be displayed on the display section 8 as image data for monitoring. At the same time, the second camera system 1D is configured to perform photographing operation using the image pickup section 2 provided in the camera unit 10. Note that the optical image formed on a light-receiving surface of the image pickup section 2 is formed by the photographing lens unit 20.

In the present embodiment configured as described above, when a photographer uses the first camera system 1A to arbitrarily perform photographing operation, various related photographing information is acquired from the image data acquired by the photographing operation. The various information acquired by the first camera system 1A is transmitted to the second camera system 1D.

The second camera system 1D is in a state where the image for monitoring (entire circumferential image) based on the image data acquired using the camera function of the lens-equipped wireless communication adapter 30A is being displayed. When the various information is received from the first camera system 1A in this state, the image data for monitoring is referred to, based on the various information, and presence or absence of a similar image is confirmed.

When there is a similar image according to the received various information, the movable tripod stand 40 is driven and controlled, and the photographing lens unit 20 of the second camera system 1D is directed in a direction where an image matching the similar image can be acquired. Then, the image pickup section 2 and the like of the camera unit 10 is driven and controlled, thereby carrying out the photographing operation processing.

Thus, it is possible to perform photographing by making the first camera system 1A cooperative with the second camera system 1D also in the present embodiment.

In the present embodiment, the lens-equipped wireless communication adapter 30A having an omnidirectional lens and the movable tripod stand 40 are further provided, thereby capable of performing a cooperative photographing with higher degree of freedom.

Note that the present invention is not limited to the embodiments described above, and various modifications and applications can be made without departing from the gist of the present invention. Furthermore, the above-described embodiments include inventions of various stages, and by combining a plurality of constituent components disclosed in the embodiments, inventions of various stages can also be extracted. For example, even if some constituent features are deleted from among all constituent features that are disclosed in the embodiments, if it is possible to solve the problems to be solved by the invention and the advantages of the present invention can be obtained, the configuration having this constituent feature deleted can be extracted as the invention. The present invention is not limited by a specific embodiment except as by the appended claims.

The present invention is not limited to a specific type of a photographing apparatus as an electronic device specialized for a photographing function such as a digital camera, and may be applied to various electronic devices such as other type of electronic devices including a photographing apparatus, namely, a mobile phone, a memory device, an electronic diary, a personal computer, a game instrument, a television, a clock, a navigation device using a GPS (Global Positioning System) and the like.

What is claimed is:

1. A photographing apparatus comprising:
  an image pickup section;
  a detection section for acquiring composition information for determining a composition in an image pickup operation performed by another photographing apparatus, based on an image acquired by the image pickup section; and
  a transmission section for transmitting the composition information acquired by the detection section to the other photographing apparatus, the composition information being information for the other photographing apparatus to perform trimming and change an image.

2. The photographing apparatus according to claim 1, wherein the composition information is acquired by following a desired object over more than one image pickup operation.

3. The photographing apparatus according to claim 2, wherein the composition information acquired by following a desired object over more than one image pickup operation is information on feature of a face viewed from a different angle other than front.

4. The photographing apparatus according to claim 1, wherein the transmission section transmits an information signal indicating that image pickup is being performed to the other photographing apparatus.

5. A photographing system for performing image pickup by making a plurality of photographing apparatuses including at least a first photographing apparatus and a second photographing apparatus cooperative with each other, the photographing system comprising:
  the first photographing apparatus including a first image pickup section, a detection section for acquiring composition information for determining a composition in an image pickup operation performed by the second photographing apparatus, based on an image acquired by the first image pickup section, and a transmission section for transmitting the composition information acquired by the detection section to the second photographing apparatus, the composition information being information for the second photographing apparatus to perform trimming and change an image; and
  the second photographing apparatus including a reception section for receiving the composition information transmitted from the first photographing apparatus, and a second image pickup section for acquiring an image based on the composition information received by the reception section.

6. A photographing method comprising steps of:
  acquiring an image;
  acquiring composition information for determining a composition in image pickup performed by another photographing apparatus, based on the image acquired by an image pickup section; and
  transmitting the composition information acquired by a detection section to the other photographing apparatus, the composition information being information for the other photographing apparatus to perform trimming and change an image.

7. A non-transitory medium in a photographing apparatus, storing a program performing control for:
  acquiring an image;
  acquiring composition information for determining a composition in image pickup performed by another photographing apparatus; and
  transmitting the composition information acquired by a detection section to the other photographing apparatus, the composition information being information for the other photographing apparatus to perform trimming and change an image.

* * * * *